United States Patent
Igarashi

(10) Patent No.: US 12,021,567 B2
(45) Date of Patent: Jun. 25, 2024

(54) OPTICAL RECEIVING DEVICE AND CLOCK SYNCHRONIZATION METHOD

(71) Applicant: NIPPON TELEGRAPH AND TELEPHONE CORPORATION, Tokyo (JP)

(72) Inventor: Ryo Igarashi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 37 days.

(21) Appl. No.: 17/927,029

(22) PCT Filed: May 27, 2020

(86) PCT No.: PCT/JP2020/020971
§ 371 (c)(1),
(2) Date: Nov. 22, 2022

(87) PCT Pub. No.: WO2021/240695
PCT Pub. Date: Dec. 2, 2021

(65) Prior Publication Data
US 2023/0208528 A1  Jun. 29, 2023

(51) Int. Cl.
*H04B 10/61* (2013.01)
*H04L 27/26* (2006.01)

(52) U.S. Cl.
CPC ......... *H04B 10/61* (2013.01); *H04L 27/2657* (2013.01)

(58) Field of Classification Search
None
See application file for complete search history.

(56) References Cited

U.S. PATENT DOCUMENTS

2007/0092260 A1* 4/2007 Bontu ............... H04J 3/0608 398/152
2009/0060511 A1* 3/2009 Toyoshima ......... H04L 7/033 398/74

(Continued)

OTHER PUBLICATIONS

K. Kikuchi, "Digital coherent optical communication systems: fundamentals and future prospects", IEICE Electronics Express, vol. 8, No. 20, 1642-1662, 2011.

(Continued)

*Primary Examiner* — David W Lambert
(74) *Attorney, Agent, or Firm* — Harness, Dickey & Pierce, P.L.C.

(57) ABSTRACT

An optical reception apparatus includes an optical coherent reception unit that generates an I-axis component of a reception signal and a Q-axis component of the reception signal based on an optical signal subjected to continuous phase frequency shift keying, a conversion unit that generates a digital signal of the I-axis component of the reception signal and a digital signal of the Q-axis component of the reception signal, a differential detection unit that generates a differential detection signal, a frequency offset compensation unit that derives a phase change amount or a temporal change in the Q-axis component of the differential detection signal whose component of a frequency offset has been compensated, a clock error detection unit that detects an amount of shift of a sampling phase of the differential detection signal whose component of the frequency offset has been compensated, based on the phase change amount or the temporal change in the Q-axis component of the differential detection signal, and a reception clock generation unit that generates the clock at a frequency adjusted such that the amount of shift becomes small.

6 Claims, 15 Drawing Sheets

(56) References Cited

U.S. PATENT DOCUMENTS

| | | | | |
|---|---|---|---|---|
| 2009/0129493 | A1* | 5/2009 | Zhang | H04L 1/005 |
| | | | | 375/260 |
| 2009/0262869 | A1* | 10/2009 | Beaulieu | H04B 7/0854 |
| | | | | 375/340 |
| 2010/0329697 | A1* | 12/2010 | Koizumi | H04L 27/223 |
| | | | | 398/208 |
| 2011/0229127 | A1* | 9/2011 | Sakamoto | H04B 10/6165 |
| | | | | 398/25 |
| 2012/0224184 | A1* | 9/2012 | Li | H04B 10/60 |
| | | | | 356/491 |
| 2015/0372766 | A1* | 12/2015 | Yoshida | H04B 10/61 |
| | | | | 398/208 |

OTHER PUBLICATIONS

F.M. Gardner, "A BPSK/QPSK Timing-Error Detector for Sampled Receivers", IEEE Transactions on Communications, vol. COM-34, No. 5, May 1986.

T. Kanai et al., "Wide-Range Frequency Offset Compensation for CPFSK used as TDM-Based Digital Coherent PON's Upstream Signals", ECOC2018, Nov. 15, 2018.

* cited by examiner

OPTICAL RECEIVING DEVICE AND CLOCK SYNCHRONIZATION METHOD

CROSS-REFERENCE TO RELATED APPLICATIONS

This application is a 371 U.S. National Phase of International Application No. PCT/JP2020/020971, filed on May 27, 2020. The entire disclosure of the above application is incorporated herein by reference.

TECHNICAL FIELD

The present disclosure relates to an optical receiving device and a clock synchronization method.

BACKGROUND ART

In order to increase a transmission distance of an optical signal and a transmission capacity, an optical communication system based on a digital coherent transmission scheme such as binary phase shift keying (BPSK) and quadrature phase shift keying (QPSK) has been proposed (see NPL 1).

FIG. 12 is a diagram illustrating an example of an optical communication system. The optical communication system includes a transmitter 100, a transmission clock generation unit 101, a receiver 102, a reception clock generation unit 103, and a transmission line 104.

The transmission clock generation unit 101 outputs a clock used for transmission of an optical signal to the transmitter 100. The transmitter 100 transmits the optical signal via the transmission line 104 using the clock generated by the transmission clock generation unit 101. The reception clock generation unit 103 outputs a clock used for reception of an optical signal to the receiver 102. The receiver 102 generates a reception signal (analog signal) based on the optical signal received via the transmission line 104. The receiver 102 samples the generated reception signal (analog signal) using the clock generated by the reception clock generation unit 103.

In asynchronous communication, a clock of the transmitter 100 does not exactly match a clock of the receiver 102. Thus, an amount of shift of the sampling phase increases over time. In order to prevent an increase in the amount of shift of the sampling phase, the receiver 102 extracts, for example, the clock used for transmission in the transmitter 100 from the reception signal. The receiver 102 synchronizes the phase of the clock used for reception with the phase of the clock used for transmission.

Synchronizing the phase of the clock used for transmission with the phase of the clock used for reception is called "clock recovery". NPL 2 proposes a clock recovery method in a BPSK scheme and a QPSK scheme.

FIG. 13 is a diagram illustrating a configuration example of an optical communication system using clock recovery in a QPSK scheme or the like in the related art. The optical communication system (synchronous communication system) illustrated in FIG. 13 includes an optical transmission apparatus 200, an optical reception apparatus (receiving device) 300, and a transmission line 400. The optical transmission apparatus 200 includes a frame generation unit 201, a signal generation unit 202, and an optical coherent transmission unit 203.

The optical reception apparatus 300 includes an optical coherent reception unit 301, an ADC (analog/digital converter) 302, an interpolation unit 303, an equalizer 304, a clock phase detection unit 305, a loop filter 306, a reception clock generation unit 307, a frequency offset compensation unit 308, a phase offset compensation unit 309, and a decoding unit 310.

The frame generation unit 201 acquires transmission data (digital signal). The frame generation unit 201 generates a frame in which the transmission data is included in a payload. The frame generation unit 201 outputs the frame to the signal generation unit 202.

The signal generation unit 202 generates, as transmission signals, a modulation signal corresponding to an I-axis component and a modulation signal corresponding to a Q-axis component at the time of QPSK modulation according to the frame. The signal generation unit 202 outputs the modulation signal of the I-axis component and the modulation signal of the Q-axis component to the optical coherent transmission unit 203.

The optical coherent transmission unit 203 uses the modulation signal of the I-axis component and the modulation signal of the Q-axis component to modulate light output from a light source included in the optical coherent transmission unit 203. Thus, a coherent optical signal is generated. The optical coherent transmission unit 203 transmits the generated coherent optical signal to the optical reception apparatus 300 via the transmission line 400.

The optical coherent reception unit 301 receives the coherent optical signal transmitted via the transmission line 400. The optical coherent reception unit 301 generates a reception signal by executing coherent detection for the received coherent optical signal. Here, the optical coherent reception unit 301 generates an I-axis component of the reception signal and a Q-axis component of the reception signal based on a result of the coherent detection. The optical coherent reception unit 301 outputs the I-axis component of the reception signal and the Q-axis component of the reception signal to the ADC 302.

The ADC 302 samples the I-axis component of the reception signal by using a clock generated by the reception clock generation unit 307, thereby generating a digital signal (discrete signal) of the I-axis component of the reception signal. Similarly, the ADC 302 samples the Q-axis component of the reception signal by using the clock generated by the reception clock generation unit 307, thereby generating a digital signal (discrete signal) of the Q-axis component of the reception signal.

The interpolation unit 303 interpolates the data between sampling points in the digital signal of the I-axis component. The interpolation unit 303 interpolates the data between sampling points in the digital signal of the Q-axis component. Thus, the sampling rate of the reception signal is improved. The interpolation unit 303 outputs the digital signal of the I-axis component of the reception signal with the improved sampling rate and the digital signal of the Q-axis component of the reception signal with the improved sampling rate to the equalizer 304.

The equalizer 304 executes adaptive equalization processing for the digital signal of the I-axis component of the reception signal with the improved sampling rate and the digital signal of the Q-axis component of the reception signal with the improved sampling rate. For example, the equalizer 304 compensates for deterioration caused in a waveform of the reception signal due to band limitation in the optical coherent transmission unit 203 and the optical coherent reception unit 301 and transmission of the coherent optical signal through the transmission line 400 using a finite impulse response (FIR) filter or the like.

The equalizer 304 outputs the digital signal of the I-axis component of the reception signal for which the adaptive equalization processing has been executed and the digital signal of the Q-axis component of the reception signal for which the adaptive equalization processing has been executed, to the clock phase detection unit 305. The equalizer 304 outputs the digital signal for which the adaptive equalization processing has been executed, to the frequency offset compensation unit 308.

The clock phase detection unit 305 detects an amount of shift between the phase of the clock used for transmission of the optical signal by the optical coherent transmission unit 203 and the phase of the clock used for reception by the ADC 302 based on the amount of shift of the sampling phase. The clock phase detection unit 305 outputs the detected amount of shift of the clock phase to the loop filter 306 as a value of an error function.

The loop filter 306 has properties of a low-pass filter. The loop filter 306 averages the value of the error function acquired from the clock phase detection unit 305. The loop filter 306 outputs the averaged value of the error function to the reception clock generation unit 307.

The reception clock generation unit 307 generates a clock based on the averaged value of the error function fed back from the clock phase detection unit 305. The reception clock generation unit 307 outputs the generated clock to the ADC 302. Thus, the reception clock generation unit 307 synchronizes the phase of the clock used for sampling of the ADC 302 with the phase of the clock used for transmission by the optical coherent transmission unit 203, based on the averaged value of the error function fed back from the clock phase detection unit 305.

The frequency offset compensation unit 308 executes frequency offset compensation processing for the digital signal for which the adaptive equalization processing has been executed. The frequency offset compensation unit 308 outputs the digital signal whose frequency offset has been compensated to the phase offset compensation unit 309.

The phase offset compensation unit 309 executes phase offset compensation processing for the digital signal whose frequency offset has been compensated. That is, the phase offset compensation unit 309 removes a phase offset component that is fixed in time from the digital signal. The phase offset compensation unit 309 outputs the digital signal whose phase offset and frequency offset have been compensated to the decoding unit 310.

The decoding unit 310 executes determination processing for a constellation of the digital signal whose phase offset and frequency offset have been compensated. Thus, a code sequence of the transmission data is decoded from the digital signal whose phase offset and frequency offset have been compensated. The decoding unit 310 outputs a digital signal indicating a decoding result to a predetermined external apparatus (not illustrated).

The clock phase detection unit 305 or the reception clock generation unit 307 determines whether a time at a sampling position is later than a time at a symbol position, based on a positive or negative value of the error function indicating the amount of shift of the sampling phase in the reception signal. The clock phase detection unit 305 can synchronize the phase of the clock used for reception with the phase of the clock used for transmission by feeding back the value of the error function to the reception clock generation unit 307.

FIG. 14 is a diagram illustrating an example of clock recovery using a Gardner method (see NPL 2). Hereinafter, an intensity of the reception signal at a time "$t_{g1}$" is expressed as "$A(t_{g1})$". An intensity of the reception signal at the time "$t_{g2}$" is expressed as "$A(t_{g2})$". An intensity of the reception signal at the time "$t_{g3}$" is expressed as "$A(t_{g3})$".

Hereinafter, a period of the symbol is expressed as "T". An interval between the time "$t_{g1}$" and time "$t_{g2}$" is "T/2". An interval between the time "$t_{g2}$" and the time "$t_{g3}$" is "T/2".

In such a case, an output of the error function "$F_{error}(t_{g1}, t_{g2}, t_{g3})$" (the value of the error function) derived by using the Gardner method is expressed by Equation (1).

[Math. 1]

$$F_{error}(t_{g1},t_{g2},t_{g3})=A(t_{g2})\{A(t_{g1})-A(t_{g3})\} \quad (1)$$

As illustrated in an upper section of FIG. 14, when the time "$t_{g2}$" is a time at the symbol position on the IQ plane, both a value of an intensity "$A(t_{g1})$" of the reception signal and a value of an intensity "$A(t_{g3})$" of the reception signal are "0", and thus, the value of the error function "$F_{error}$" becomes "0".

As illustrated in a middle section of FIG. 14, when a time of the sampling position (a position of the sampling point) is later than the time of the symbol position, the intensity "$A(t_{g1})$" of the reception signal <0, the intensity "$A(t_{g2})$" of the reception signal <0, and the intensity "$A(t_{g3})$" of the reception signal >0 are satisfied, and thus the value of the error function "$F_{error}$" becomes larger than "0".

As illustrated in a lower section of FIG. 14, when the time at the sampling position is earlier than the time at the symbol position, the reception signal "$A(t_{g1})$">0, the reception signal "$A(t_{g2})$"<0, and the reception signal "$A(t_{g3})$"<0 are satisfied, and thus the value of the error function "$F_{error}$" becomes smaller than "0".

The Gardner method is a method capable of being extended to a signal having an I-axis component and a Q-axis component (for example, a QPSK signal). Hereinafter, an intensity of the I-axis component of the reception signal at the time "$t_{g1}$" is expressed as "$A_I(t_{g1})$". An intensity of the I-axis component of the reception signal at the time "$t_{g2}$" is expressed as "$A_I(t_{g2})$". An intensity of the I-axis component of the reception signal at the time "$t_{g3}$" is expressed as "$A_I(t_{g3})$".

Hereinafter, an intensity of the Q-axis component of the reception signal at the time "$t_{g1}$" is expressed as "$A_Q(t_{g1})$". An intensity of the Q-axis component of the reception signal at the time "$t_{g2}$" is expressed as "$A_Q(t_{g2})$". An intensity of the Q-axis component of the reception signal at the time "$t_{g3}$" is expressed as "$A_Q(t_{g3})$".

When the signal has an I-axis component and a Q-axis component, the error function is expressed as in Equation (2).

[Math. 2]

$$F_{error}(t_{g1},t_{g2},t_{g3})=A_I(t_{g2})\{A_I(t_{g1})-A_I(t_{g3})\}+A_Q(t_{g2})\{A_Q(t_{g1})-A_Q(t_{g3})\} \quad (2)$$

The clock phase detection unit 305 can synchronize the phase of the clock used for reception with the phase of the clock used for transmission by using Equation (2) (see NPL 2).

Further, many digital coherent transmission schemes require an IQ modulator in an optical transmission apparatus. Thus, in many digital coherent transmission schemes, a cost of the optical transmission apparatus increases. Thus, as a method for achieving cost reduction of the optical transmission apparatus, the optical transmission apparatus and the optical reception apparatus communicating with each other by using an optical signal in a continuous phase frequency shift keying (CPFSK) scheme have been proposed (see NPL 3).

FIG. 15 is a diagram illustrating an example of frequency modulation of an optical signal of a CPFSK scheme in the related art. In the CPFSK scheme, the optical transmission apparatus executes frequency modulation for an optical signal, and the optical reception apparatus derives a phase change amount occurring in the optical signal within a certain time, thereby the optical transmission apparatus and the optical reception apparatus can communicate with each other. In this case, because the optical transmission apparatus does not require an IQ modulator, cost reduction of the optical transmission apparatus is achieved.

CITATION LIST

Non Patent Literature

NPL 1: K. Kikuchi, "Digital coherent optical communication systems: fundamentals and future prospects", IEICE Electronics Express, Vol. 8, No. 20, 1642-1662, 2011.
NPL 2: F. M. Gardener, "A BPSK/QPSK Timing-Error Detector for Sampled Receivers", IEEE TRANSACTION ON COMMUNICATIONS, Vol. COM-34, No. 5, May 1986.
NPL 3: T. Kanai, et al., "Wide-Range Frequency Offset Compensation for CPFSK used as TOM-Based Digital Coherent PON's Upstream Signals", ECOC 2019

SUMMARY OF THE INVENTION

Technical Problem

In a CPFSK scheme, frequency modulation is executed for an optical signal. However, in the CPFSK scheme, because modulation of an intensity component of an optical signal is small, the optical reception apparatus cannot synchronize the phase of the clock used for transmission with the phase of the clock used for reception when a clock recovery method in the related art is executed as it is. Thus, the related art has a problem that the phase of the clock used for transmission of the frequency-modulated optical signal having a fixed light intensity (for example, an optical signal in the CPFSK scheme) cannot be synchronized with the phase of the clock used for reception.

In view of the above circumstances, an object of the present disclosure is to provide an optical reception apparatus and a clock synchronization method capable of synchronizing a phase of a clock used for transmission of a frequency-modulated optical signal having a fixed light intensity with a phase of a clock used for reception.

Means for Solving the Problem

One aspect of the present disclosure is an optical reception apparatus including: an optical coherent receiver that receives a frequency-modulated optical signal having a fixed light intensity and executes coherent detection for the received optical signal, thereby generating an I-axis component of a reception signal and a Q-axis component of the reception signal based on the optical signal; a converter that samples the I-axis component of the reception signal and the Q-axis component of the reception signal using a clock, thereby generating a digital signal of the I-axis component of the reception signal and a digital signal of the Q-axis component of the reception signal; a differential detector that executes differential detection for the digital signal of the I-axis component and the digital signal of the Q-axis component, thereby generating a differential detection signal; a frequency offset compensator that derives a phase change amount or a temporal change in the Q-axis component of the differential detection signal whose component of a frequency offset has been compensated; a clock error detector that detects an amount of shift of a sampling phase of the differential detection signal whose component of the frequency offset has been compensated, based on the phase change amount or the temporal change in the Q-axis component of the differential detection signal; and a reception clock generator that generates the clock at a frequency adjusted such that the amount of shift becomes small.

One aspect of the present disclosure is a clock synchronization method executed by an optical reception apparatus, the clock synchronization method including: receiving a frequency-modulated optical signal having a fixed light intensity and executing coherent detection for the received optical signal, thereby generating an I-axis component of a reception signal and a Q-axis component of the reception signal based on the optical signal; sampling the I-axis component of the reception signal and the Q-axis component of the reception signal using a clock, thereby generating a digital signal of the I-axis component of the reception signal and a digital signal of the Q-axis component of the reception signal; executing differential detection for the digital signal of the I-axis component and the digital signal of the Q-axis component, thereby generating a differential detection signal; deriving a phase change amount or a temporal change in the Q-axis component of the differential detection signal whose component of a frequency offset has been compensated; detecting an amount of shift of a sampling phase of the differential detection signal whose component of the frequency offset has been compensated, based on the phase change amount or the temporal change in the Q-axis component of the differential detection signal; and generating the clock at a frequency adjusted such that the amount of shift becomes small.

Effects of the Invention

According to the present disclosure, it is possible to synchronize the phase of the clock used for transmission of the frequency-modulated optical signal having a fixed light intensity with the phase of the clock used for reception.

DETAILED DESCRIPTION OF THE INVENTION

Embodiments of the present disclosure will be described in detail with reference to the drawings.

First Embodiment

Figure 1:
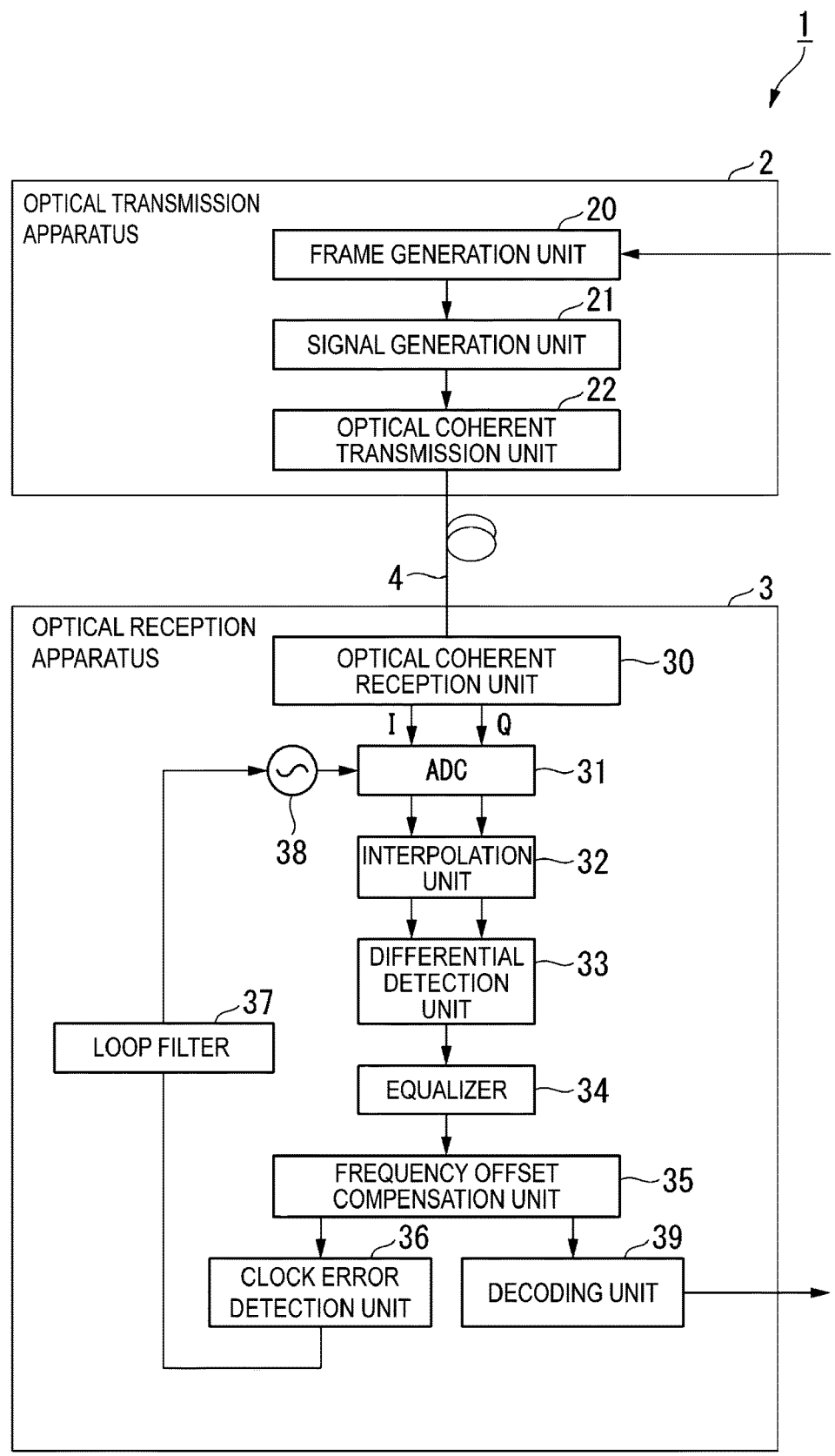
FIG. 1 is a diagram illustrating a configuration example of an optical communication system according to a first embodiment.

FIG. 1 is a diagram illustrating a configuration example of an optical communication system 1 in a first embodiment. The optical communication system 1 is a system that performs communication using an optical signal having a small modulation of an intensity component (for example, an optical signal in a CPFSK scheme).

The optical communication system 1 executes differential detection processing for a reception signal obtained by executing coherent detection for an optical signal subjected to CPFSK modulation. The optical communication system 1 executes processing of compensating for a frequency offset for the differential detection signal obtained as a result of the differential detection processing.

In the CPFSK scheme, because an intensity component of the differential detection signal does not change over time, it is difficult to extract the clock from the intensity component of the differential detection signal. Thus, the optical communication system 1 extracts the clock used for transmission of the optical signal from the differential detection signal by applying the Gardner method to the phase change amount of the differential detection signal whose frequency offset has been compensated.

In the first embodiment, the Gardner method is executed for a temporal change in the phase change amount of the differential detection signal whose frequency offset has been compensated so that the Gardner method is appropriately executed for the temporal change in the phase change amount of the differential detection signal. Thus, the optical communication system 1 can synchronize the phase of the clock used for transmission of the frequency-modulated optical signal having a fixed light intensity with the phase of the clock used for reception.

The optical communication system 1 (synchronous communication system) includes an optical transmission apparatus 2, an optical reception apparatus 3, and a transmission line 4. The optical transmission apparatus 2 includes a frame generation unit 20, a signal generation unit 21, and an optical coherent transmission unit 22.

The optical reception apparatus 3 includes an optical coherent reception unit 30, an ADC (analog/digital converter) 31, an interpolation unit 32, a differential detection unit 33, an equalizer 34, a frequency offset compensation unit 35, a clock error detection unit 36, a loop filter 37, a reception clock generation unit 38, and a decoding unit 39. The transmission line 4 includes an optical fiber.

The frame generation unit 20 acquires transmission data (digital signal). The frame generation unit 20 generates a frame including the transmission data in a payload. The frame generation unit 20 outputs the frame to the signal generation unit 21.

The signal generation unit 21 generates a modulation signal at the time of CPFSK modulation according to the frame as a transmission signal. The signal generation unit 21 outputs the modulation signal to the optical coherent transmission unit 22.

The optical coherent transmission unit 22 uses the modulation signal to directly modulate a drive voltage of a light source included in the optical coherent transmission unit 22. When the light source is directly modulated, the intensity and frequency of the output light change according to the modulation signal. When an amplitude of the modulation signal is small, an intensity modulation component can be ignored and the frequency modulation is performed. Thus, a frequency-modulated coherent optical signal is generated. Thus, a coherent optical signal is generated. The optical coherent transmission unit 22 transmits the generated coherent optical signal to the optical reception apparatus 3 via the transmission line 4.

The optical coherent reception unit 30 receives the coherent optical signal transmitted via the transmission line 4. The optical coherent reception unit 30 generates a reception signal by executing coherent detection for the received coherent optical signal. Here, the optical coherent reception unit 30 generates an I-axis component of the reception signal and a Q-axis component of the reception signal based on a result of the coherent detection. The optical coherent reception unit 30 outputs the I-axis component of the reception signal and the Q-axis component of the reception signal to the ADC 31.

The ADC 31 (conversion unit) samples the I-axis component of the reception signal using a clock generated by the reception clock generation unit 38. Thus, the ADC 31 generates a digital signal (discrete signal) of the I-axis component of the reception signal. Similarly, the ADC 31 samples the I-axis component of the reception signal using the clock generated by the reception clock generation unit 38. Thus, the ADC 31 generates a digital signal (discrete signal) of the Q-axis component of the reception signal.

The interpolation unit 32 interpolates data between the sampling points in the digital signal of the I-axis component. Further, the interpolation unit 303 interpolates data between the sampling points in the digital signal of the Q-axis component. Thus, the sampling rate of the reception signal is improved. The interpolation unit 32 outputs the digital signal of the I-axis component of the reception signal with the improved sampling rate and the digital signal of the Q-axis component of the reception signal with the improved sampling rate to the differential detection unit 33.

In the Gardner method, a period of the sampling points used for derivation of the amount of shift of the sampling phase is half (=T/2) of a symbol period "T". Thus, an even number of sampling points are generated as a result of the sampling in the ADC 31 and the interpolation processing in the interpolation unit 32 being executed in one symbol period.

The differential detection unit 33 acquires the digital signal of the I-axis component of the reception signal with the improved sampling rate and the digital signal of the Q-axis component of the reception signal with the improved sampling rate from the interpolation unit 32. The differential detection unit 33 executes the differential detection processing on the acquired digital signals.

The differential detection unit 33 derives, for each sampling point, the complex amplitude "$E_r$" of the reception signal based on the digital signal of the I-axis component of the reception signal with the improved sampling rate and the digital signal of the Q-axis component of the reception signal with the improved sampling rate.

The differential detection unit 33 derives a complex conjugate product "$E_r(t_1) \cdot E_r(t_2)^*$" of a first sampling point of the reception signal and a second sampling point of the reception signal as the differential detection signal. Here, the symbol "*" indicates a complex conjugate.

The complex conjugate product "$E_r(t_1) \cdot E_r(t_2)^*$" derived as the differential detection signal includes information on a phase change amount "$\varphi_{dif}$" and information on a phase rotation "$\omega_{CFO}$" due to a frequency offset of a carrier wave. The differential detection unit 33 outputs the differential detection signal (complex conjugate product) to the equalizer 34. Because the differential detection processing is executed, the phase offset component that is fixed in time is removed from the differential detection signal. That is, the phase offset is compensated in the differential detection signal.

The equalizer 34 acquires the differential detection signal from the differential detection unit 33. The equalizer 34 executes adaptive equalization processing for the differential detection signal. For example, the equalizer 34 compensates for deterioration caused in a waveform of the differential detection signal due to band limitation in the optical coherent transmission unit 22 and the optical coherent reception unit 30 and transmission of the coherent optical signal in the transmission line 4 using an FIR filter or the like. The equalizer 34 outputs the differential detection signal for which the adaptive equalization processing has been executed to the frequency offset compensation unit 35.

The equalizer 34 does not update a tap coefficient of the FIR filter within a time when the Gardner method is executed in the clock error detection unit 36 so that even the amount of English Translation of shift of the sampling phase (amount of shift of the clock phase) detected using the Gardner method in the clock error detection unit 36 is not compensated.

The frequency offset compensation unit 35 acquires the differential detection signal for which the adaptive equalization processing has been executed from the equalizer 34. The frequency offset compensation unit 35 compensates a frequency offset "$\omega_{CFO}\Delta t$" generated in the differential detection signal. That is, the frequency offset compensation unit 35 derives the phase change amount "$\varphi_{dif}$" of the differential detection signal for each sampling point by removing a component of the frequency offset that is fixed in time from the differential detection signal. The frequency offset compensation unit 35 outputs the phase change amount "$\varphi_{dif}$" of the differential detection signal to the clock error detection unit 36 and the decoding unit 39.

The clock error detection unit 36 acquires the phase change amount of the differential detection signal from the frequency offset compensation unit 35. The clock error detection unit 36 detects an amount of shift of a phase (sampling phase) between a clock used for transmission by the optical coherent transmission unit 22 and a clock used for reception by the ADC 31 (hereinafter referred to as a "clock phase shift amount") based on the phase change amount of the differential detection signal. The clock error detection unit 36 outputs the clock phase shift amount detected based on the phase change amount "$\varphi_{dif}$" of the differential detection signal to the loop filter 37 as the value of the error function.

The loop filter 37 has properties of a low-pass filter. The loop filter 37 averages the value of the error function (the clock phase shift amount) acquired from the clock error detection unit 36. The loop filter 37 outputs the averaged value of the error function to the reception clock generation unit 38.

The reception clock generation unit 38 generates a clock at a frequency adjusted such that the clock phase shift amount becomes small, based on the averaged value of the error function fed back from the clock error detection unit 36. The reception clock generation unit 38 outputs the generated clock to the ADC 31. Thus, the reception clock generation unit 38 synchronizes the phase of the clock used for reception by the ADC 31 with the phase of the clock used for transmission by the optical coherent transmission unit 22, based on the value of the error function fed back from the clock error detection unit 36.

The decoding unit 39 executes determination processing for a constellation of the differential detection signal whose phase offset has been compensated. That is, the decoding unit 39 identifies whether a code of the transmission signal in the CPFSK scheme is "0" or "1". Thus, a code sequence of the transmission data is decoded from the phase change amount of the differential detection signal whose frequency offset has been compensated. The decoding unit 310 outputs a digital signal indicating a decoding result to a predetermined external apparatus (not illustrated).

Next, details of the phase change amount of a transmission signal or a reception signal will be described.

Figure 2:
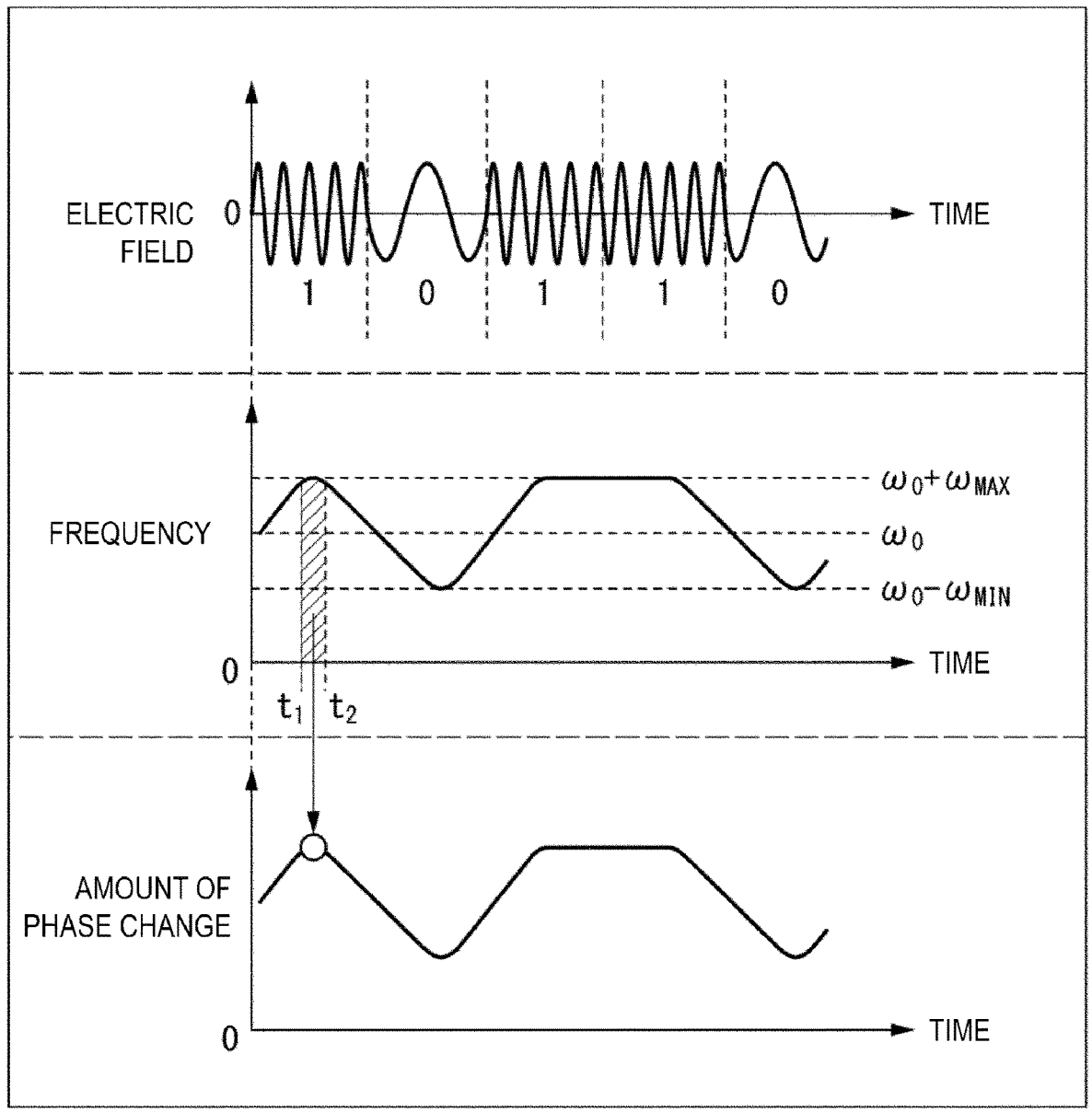
FIG. 2 is a diagram illustrating an example of a transmission signal or a reception signal in a CPFSK scheme in the first embodiment.

FIG. 2 is a diagram illustrating an example of a transmission signal or a reception signal in a CPFSK scheme in the first embodiment. An electric field waveform of the transmission signal or the reception signal is illustrated in an upper section of FIG. 2. In a binary CPFSK scheme, the code sequence of the transmission data, "a sequence of 0 and 1", is transmitted using a frequency-modulated optical signal. The electric field of the transmission signal or the reception signal is expressed by Equation (3).

[Math. 3]

$$E_{sig} = A e^{j(\omega t - \varphi)} \qquad (3)$$

Here, "$E_{sig}$" indicates the electric field of the transmission signal or the reception signal. "A" indicates an amplitude (intensity) of the electric field of the transmission signal or the reception signal. In the CPFSK scheme, an amplitude (intensity) "A" of the electric field is fixed in time. "$\omega$" indicates a frequency (angular frequency) of the transmission signal or the reception signal. "t" indicates time. "$\varphi$" indicates a phase of the transmission signal or the reception signal.

In a middle section of FIG. 2, a temporal change in the frequency "$\omega$" of the transmission signal or the reception signal is illustrated. "$\omega_0$" indicates a center frequency of the transmission signal or the reception signal. "$\omega_0 + \omega_{MAX}$" indicates a maximum value (positive value) of the frequency of the transmission signal or the reception signal when the transmission signal is frequency-modulated using a non return to zero signal. "$\omega_0+\omega_{MIN}$" indicates a minimum value (positive value) of the frequency of the transmission signal or the reception signal when the transmission signal is frequency-modulated using the non return to zero signal. The phase change amount "$\varphi_{dif}$" generated between a time "$t_1$" and a time "$t_2$" in the differential detection signal is expressed by Equation (4).

[Math. 4]

$$\varphi dif = \int_{t_1}^{t_2} \omega dt \qquad (4)$$

Thus, the phase change amount "$\varphi_{dif}$" is equal to an area (integration result) of a graph showing a change in the frequency "$\omega$" between the time "$t_1$" and the time "$t_2$". When a time "$t_2-t_1$" is short enough, the phase change amount is proportional to frequency. Thus, when the frequency of the transmission signal is modulated using the non return to zero (NRZ) signal, it is possible to modulate the phase change amount of the transmission signal using the non return to zero signal.

In a lower section of FIG. 2, the temporal change in the phase change amount "$\varphi_{dif}$" of the transmission signal or the reception signal when the time "$t_2-t_1$" is sufficiently short is illustrated. In the first embodiment, the optical transmission apparatus 2 executes frequency modulation for the transmission signal, and the optical reception apparatus 3 identifies the code based on the phase change amount of the differential detection signal.

Figure 3:
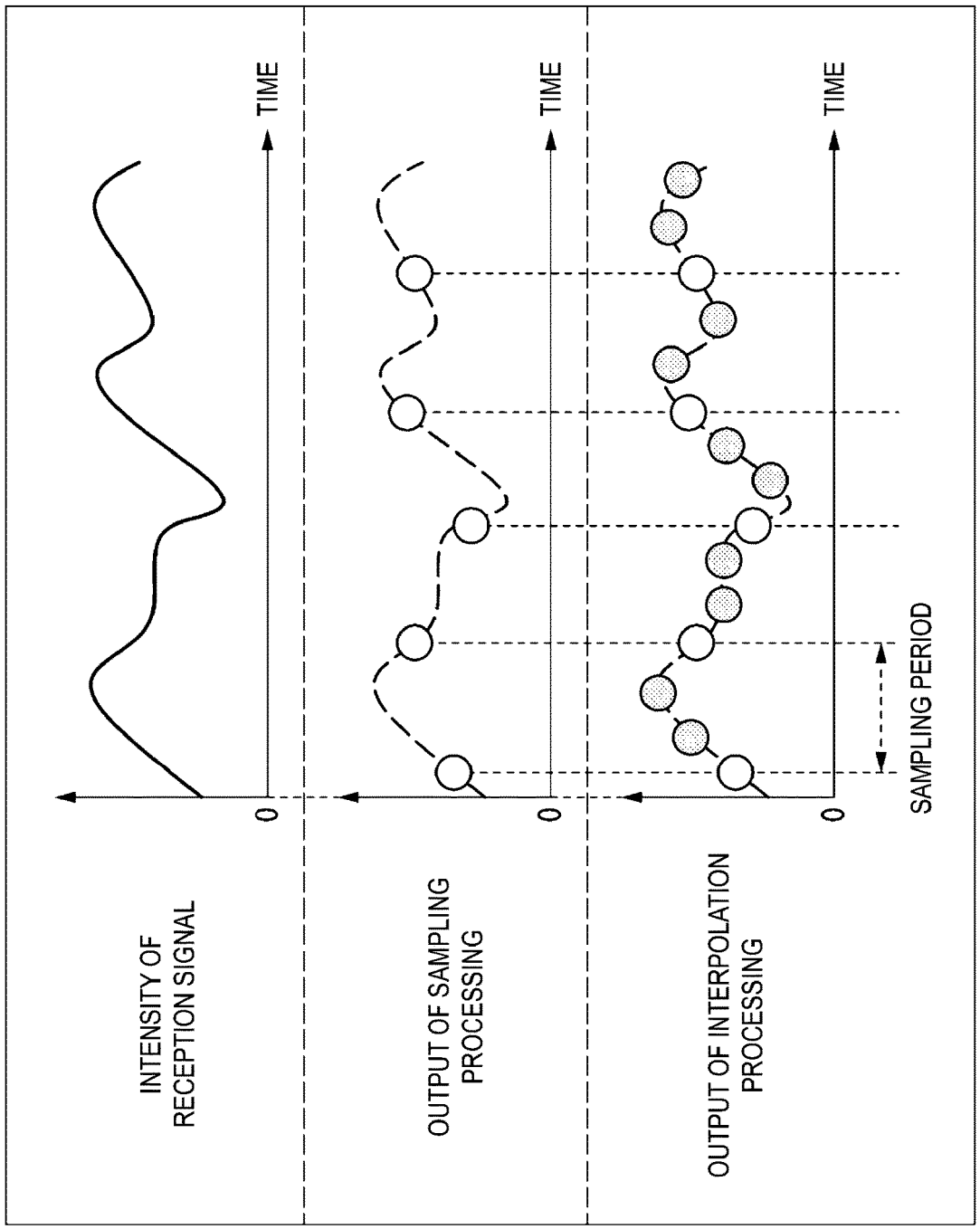
FIG. 3 is a diagram illustrating an example of an intensity of the reception signal, sampling processing, and interpolation processing in the first embodiment.

Next, the interpolation processing will be described.
FIG. 3 is a diagram illustrating an example of an intensity of the reception signal, the sampling processing, and the interpolation processing in the first embodiment. In an upper section of FIG. 3, the intensity of the reception signal based on the received coherent optical signal is shown as an intensity of the analog signal output from the optical coherent reception unit 30 to the ADC 31. The ADC 31 converts the reception signal (analog signal) output from the optical coherent reception unit 30 into a digital signal. The ADC 31 outputs the digital signal to the interpolation unit 32.

The interpolation unit 32 improves the sampling rate of the digital signal output from the ADC 31 through the interpolation processing. The interpolation unit 32 outputs the digital signal with an improved sampling rate to the differential detection unit 33.

Figure 4:
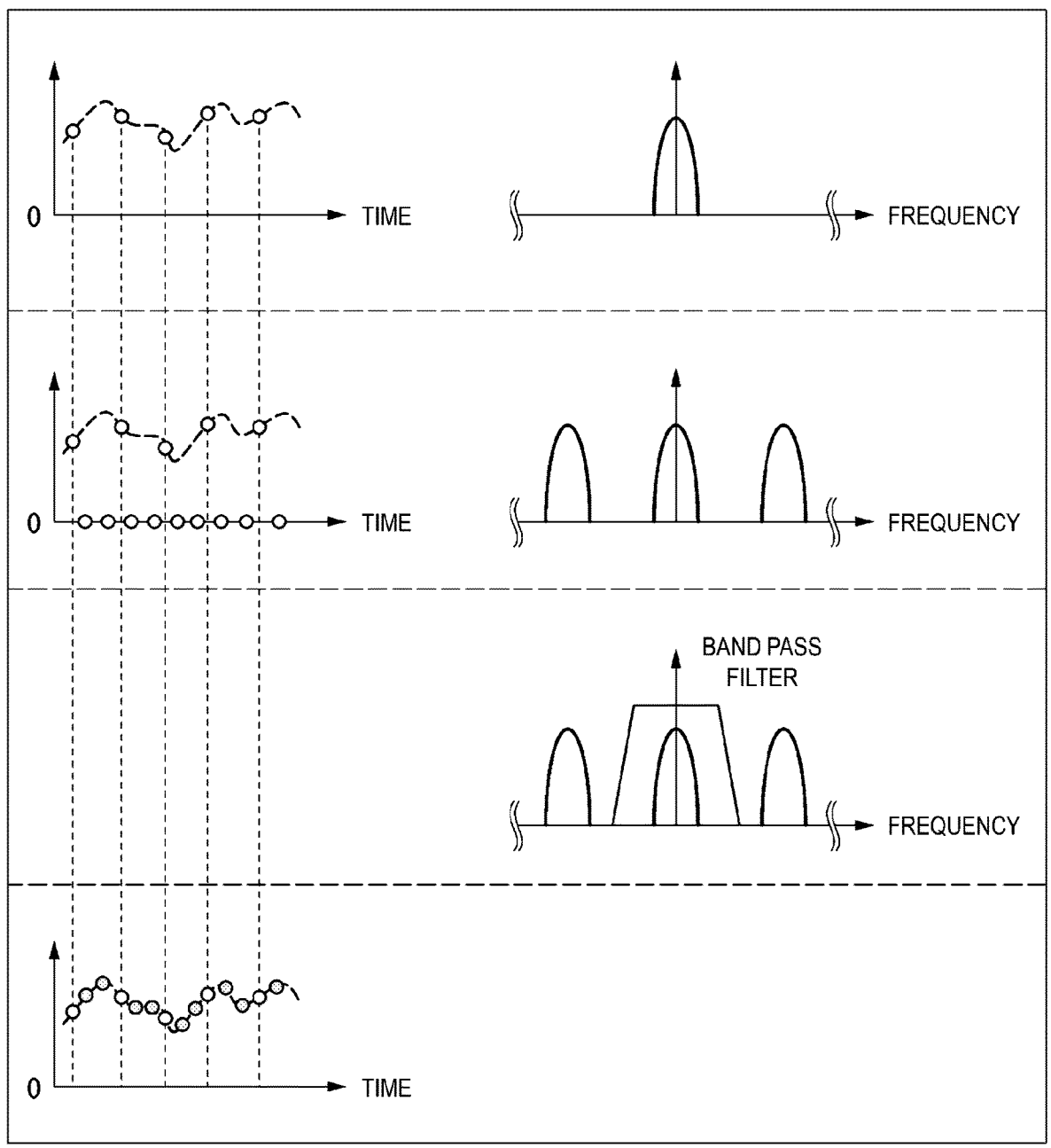
FIG. 4 is a diagram illustrating an example of details of the interpolation processing in the first embodiment.

FIG. 4 is a diagram illustrating an example of details of the interpolation processing in the first embodiment. In a first section from the top of FIG. 4, a sampling point group of an original reception signal and a result of the discrete Fourier transform of the sampling point group of the original reception signal are illustrated.

As illustrated on the left side of a second section from the top of FIG. 4, the interpolation unit 32 interpolates a new sampling point group having a value of 0 between the sampling points of the original reception signal at regular intervals. As illustrated on the right side of the second section from the top of FIG. 4, a high frequency component having the same shape as an original frequency component appears in a discrete Fourier transform result obtained by interpolating the new sampling point group.

As illustrated in a third section from the top of FIG. 4, the interpolation unit 32 uses a bandpass filter to remove high frequency components from the discrete Fourier transform result. As illustrated in a fourth section from the top of FIG. 4, a waveform of the digital signal with the improved sampling rate is generated by executing inverse Fourier transform for the discrete Fourier transform result from which the high frequency component has been removed.

Next, the complex conjugate product "$E_r(t_1) \cdot E_r(t_2)^*$" will be described.
The differential detection unit 33 derives, for each sampling point, the complex amplitude "$E_r$" of the reception signal based on the digital signal of the I-axis component of the reception signal with the improved sampling rate and the digital signal of the Q-axis component of the reception signal with the improved sampling rate. The complex amplitude "$E_r$" of the reception signal is expressed by Equation (5).

[Math. 5]

$$E_r = Ae^{j((\omega_{CFO}+\omega_m)t+\theta_0)} \qquad (5)$$

Here, "$\omega_{CFO}$" indicates phase rotation due to the frequency offset of the carrier wave. "$\omega_m$" indicates a modulation component. For the phase rotation "$\omega_{CFO}$", "$\omega_{CFO}=\omega_0-\omega_{LO}$" is satisfied. "$\omega_{LO}$" indicates a frequency of local emission. "$\theta_0$" indicates an initial phase.

A product of a complex amplitude "$E_r(t_1)$" of the reception signal at the time "$t_1$" and a complex conjugate "$E_r(t_2)^*$" of a complex amplitude of the reception signal at the time "$t_2$" after a certain time from the time "$t_1$" is expressed as in Equation (6).

[Math. 6]

$$\begin{aligned} E_r(t_1) \cdot E_r(t_2)^* & \qquad (6) \\ &= Ae^{j((\omega_{CFO}+\omega_m)t_1+\theta_0)} \cdot Ae^{-j((\omega_{CFO}+\omega_m)t_2+\theta_0)} \\ &= A^2 e^{j(\omega_m \Delta t + \omega_{CFO} \Delta t)} \\ &= A^2 e^{j(\varphi_{dif} + \omega_{CFO} \Delta t)} \end{aligned}$$

Here, "*" indicates a complex conjugate. Further, Equation (7) is satisfied.

[Math. 7]

$$\begin{cases} \Delta t = t_1 - t_2 \\ \varphi_{dif} = \omega_m \Delta t \end{cases} \qquad (7)$$

Figure 5:
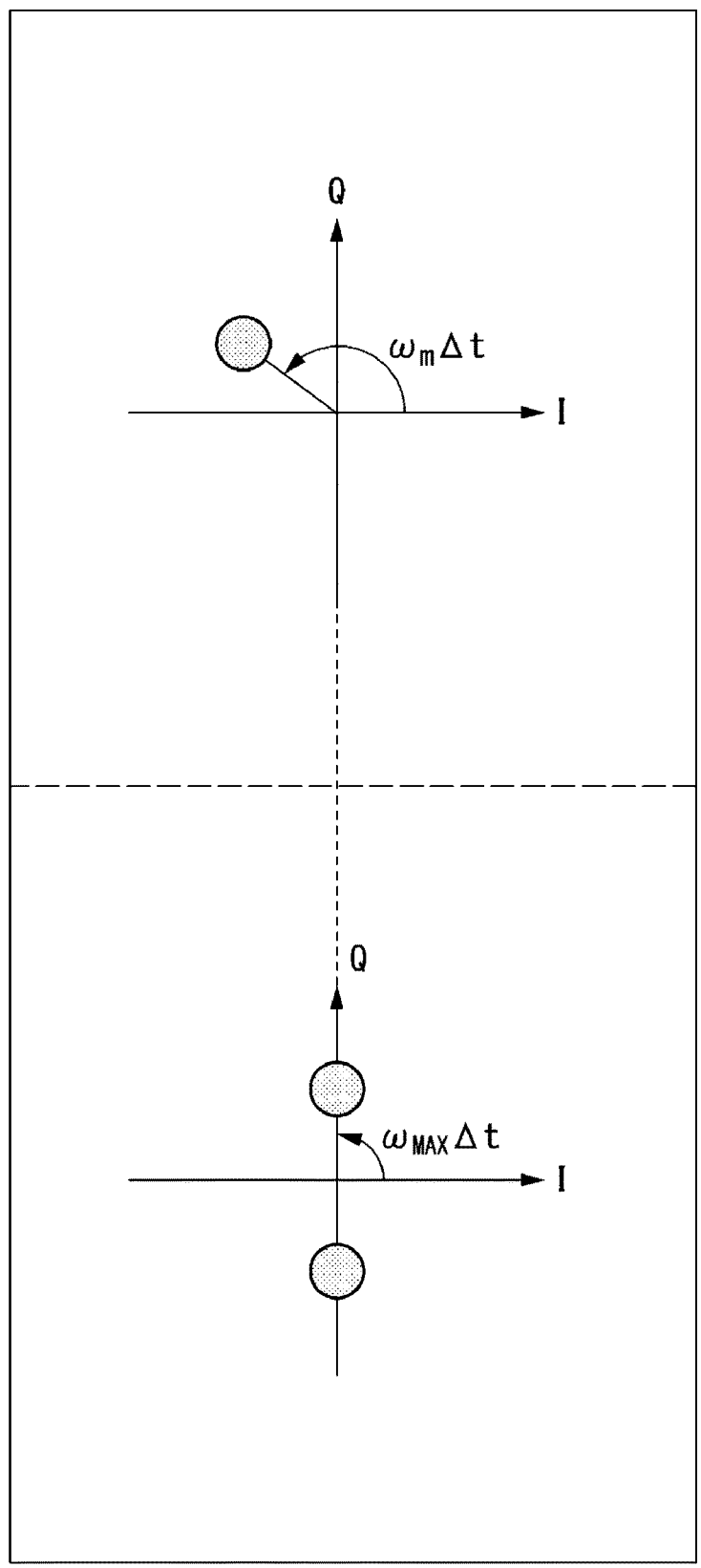
FIG. 5 is a diagram illustrating an example of a product of a reception signal at a first time and a complex conjugate of the reception signal at a second time in the first embodiment.

FIG. 5 is a diagram illustrating an example of a product of the reception signal at a first time "$t_1$" and a complex conjugate of the reception signal at a second time "$t_2$" in the first embodiment. Here, a case in which there is no frequency offset of the carrier wave will be described for simplicity of description.

In an upper section of FIG. 5, the complex conjugate product "$E_r(t_1) \cdot E_r(t_2)^*$" in a case in which there is no frequency offset of the carrier wave is illustrated. A frequency (angular frequency) of the transmission signal at a time "t" is expressed as "$\omega_0+\omega_m$".

As illustrated in a lower section of FIG. 5, when "$\omega_{MAX}\Delta t=\pi/2$" and "$\omega_{MIN}\Delta t="(-\pi/2)$" are defined, the decoding unit 39 can identify the code based on a constellation obtained as in the constellation in the BPSK scheme by the complex conjugate product being converted into a symbol. Thus, in the CPFSK scheme, communication is possible by appropriately setting a maximum value "$\omega_{MAX}$" of the frequency, a minimum value "$\omega_{MIN}$" of the frequency, and a delay amount "$\Delta t$" at the time of differential detection.

Next, the frequency offset compensation processing will be described.

Figure 6:
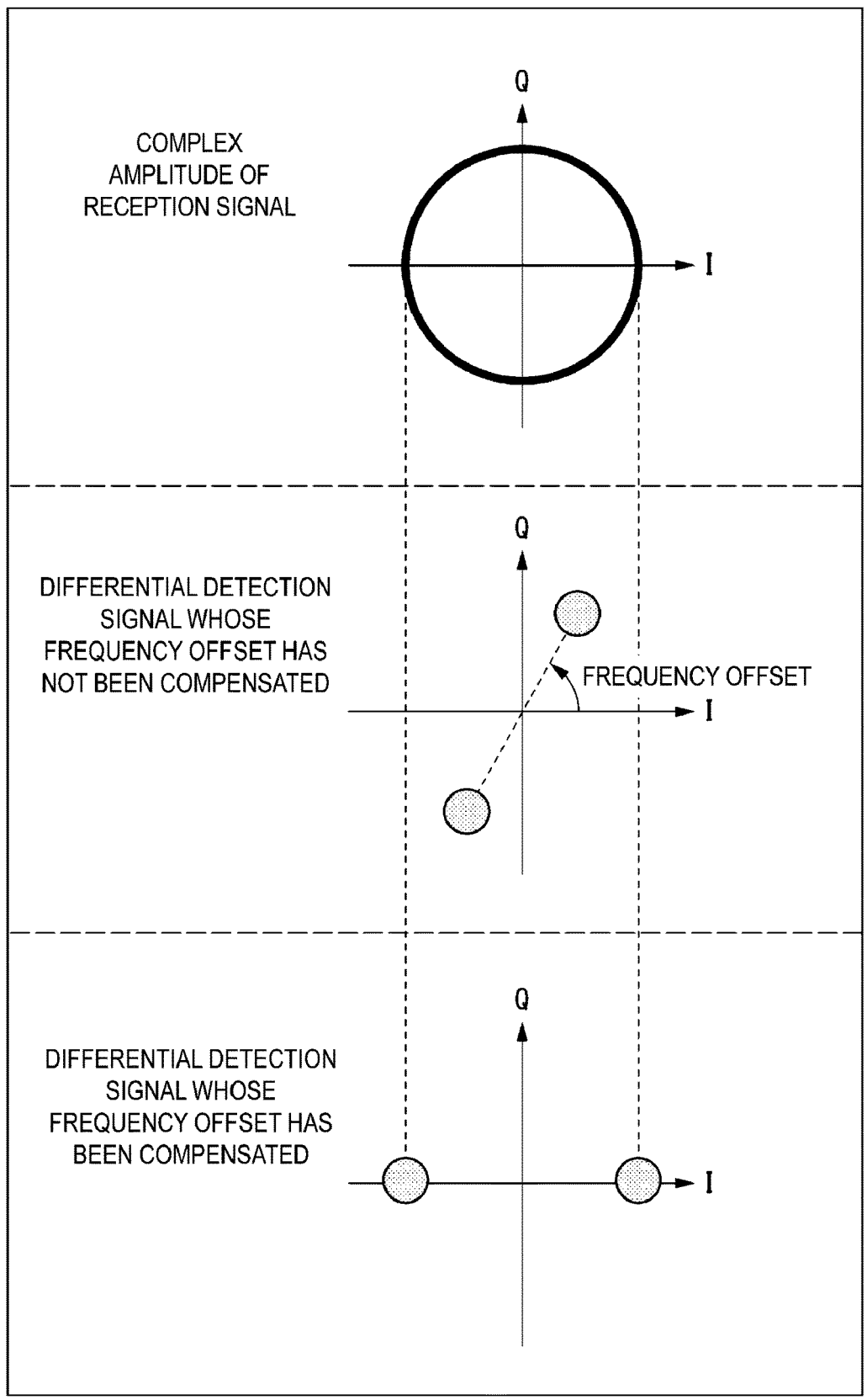
FIG. 6 is a diagram illustrating an example of a complex amplitude of a reception signal and an input and an output of a frequency offset compensation unit in the first embodiment.

FIG. 6 is a diagram illustrating an example of a complex amplitude of the reception signal and an input and output of the frequency offset compensation unit 35 in the first embodiment.

In an upper section of FIG. 6, the complex amplitude "$E_r$" of the reception signal is illustrated. In a middle section of FIG. 6, the input of the frequency offset compensation unit 35 (the output of the equalizer 34) is illustrated as a differential detection signal whose frequency offset has not been compensated. In a lower section of FIG. 6, the output of the frequency offset compensation unit 35 is illustrated as a differential detection signal who frequency offset has been compensated.

Next, details of a clock synchronization method (clock recovery method) will be described. A predetermined algorithm for clock recovery is not limited to a specific algorithm, but an example thereof is an algorithm of the Gardner method hereinafter.

Figure 7:
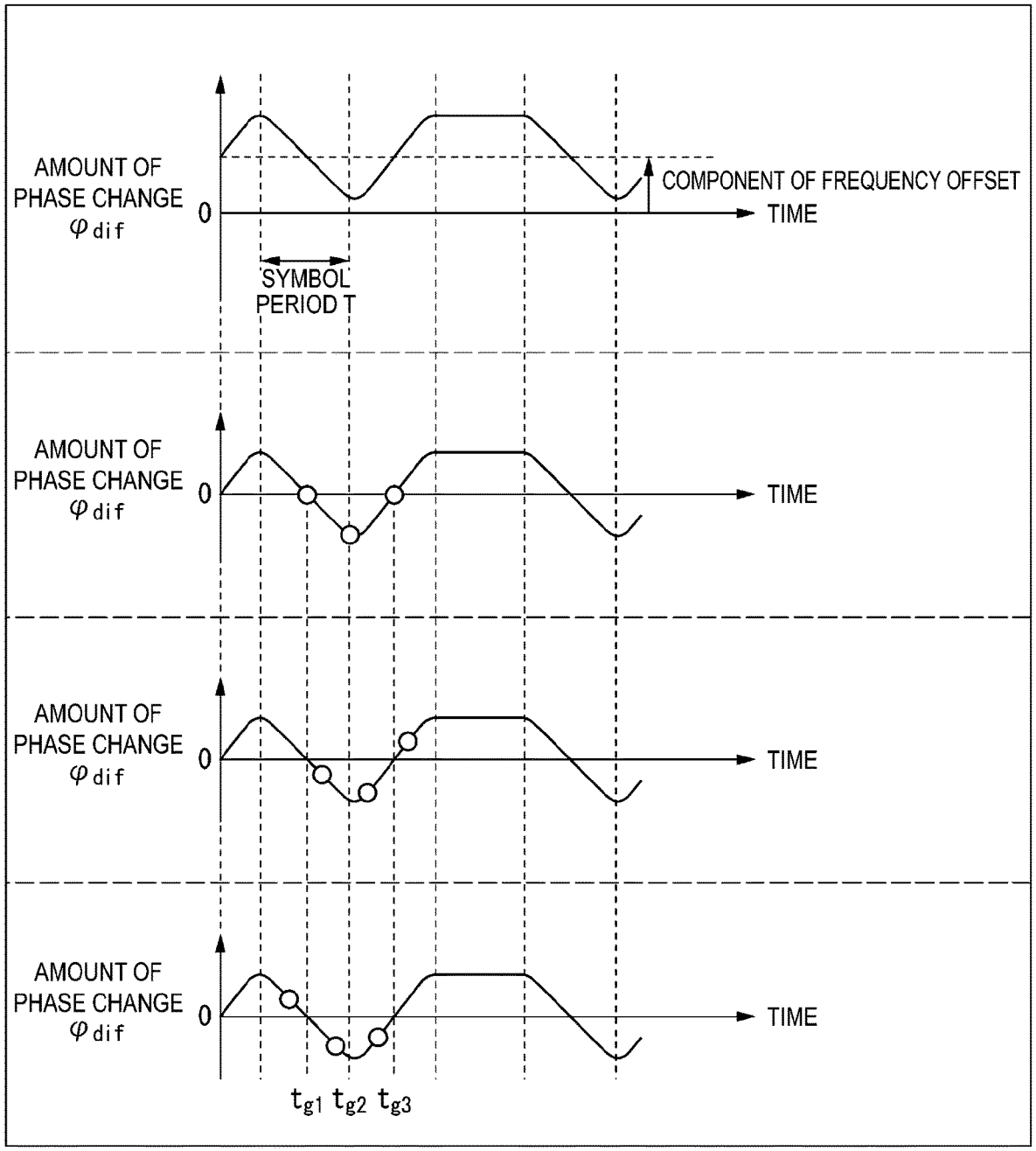
FIG. 7 is a diagram illustrating an example of a clock synchronization method using the reception signal in the CPFSK scheme in the first embodiment.

FIG. 7 is a diagram illustrating an example of the clock synchronization method using a reception signal (differential detection signal) in the CPFSK scheme in the first embodiment. In a first section from the top of FIG. 7, an example of the phase change amount of the differential detection signal whose frequency offset has not been compensated when the transmission signal is frequency-modulated using the non return to zero signal is illustrated. As illustrated in FIG. 2, a waveform of the phase change amount of reception signal is the same as a waveform of the frequency "$\omega$" of the reception signal.

In a second section from the top of FIG. 7, an example of the phase change amount "$\varphi_{dif}$" of the differential detection signal whose frequency offset has been compensated when the transmission signal is frequency-modulated using the non return to zero signal is illustrated. Because an average of the temporal change in the phase change amount "$\varphi_{dif}$" of the differential detection signal whose frequency offset has been compensated becomes 0, it is possible to apply the algorithm of the Gardner method to the differential detection signal in the CPFSK scheme. It becomes possible to detect the clock phase shift amount by applying the Gardner method to the differential detection signal in the CPFSK scheme with respect to the phase change amount "$\varphi_{dif}$" of the differential detection signal whose frequency offset has been compensated.

Hereinafter, a phase change amount of the differential detection signal at the time "$t_{g1}$" is expressed as "$\varphi_{dif}(t_{g1})$". A phase change amount of the differential detection signal at the time "$t_{g2}$" is expressed as "$\varphi_{dif}(t_{g2})$". A phase change amount of the differential detection signal at the time "$t_{g3}$" is expressed as "$\varphi_{dif}(t_{g3})$". Hereinafter, an interval between the time "$t_{g1}$" and the time "$t_{g2}$" is "T/2". An interval between the time "$t_{g2}$" and the time "$t_{g3}$" is "T/2".

The error function "$F_{error}(t_{g1}, t_{g2}, t_{g3})$" is expressed by Equation (8).

[Math. 8]

$$F_{error}(t_{g1},t_{g2},t_{g3})=\varphi_{dif}(t_{g2})\{\varphi_{dif}(t_{g3})-\varphi_{dif}(t_{g3})\} \quad (8)$$

As illustrated in the second section from the top of FIG. 7, when the time "$t_2$" is a time at the symbol position on the IQ plane, both a value of the phase change amount "$\varphi_{dif}(t_{g1})$" of the differential detection signal and a value of the phase change amount "$\varphi_{dif}(t_{g3})$" of the differential detection signal are "0", and thus, the value of the error function "$F_{error}$" becomes "0".

As illustrated in a third section from the top of FIG. 7, when the time at the sampling position (the position of the sampling point) is later than the time at the symbol position, the phase change amount "$\varphi_{dif}(t_{g1})$" of the differential detection signal <0, the phase change amount "$\varphi_{dif}(t_{g2})$" of the differential detection signal <0, and the phase change amount "$\varphi_{dif}(t_{g3})$" of the differential detection signal >0 are satisfied, and thus the value of the error function "$F_{error}$" becomes larger than "0".

As illustrated in a fourth section from the top of FIG. 7, when the time at the sampling position is earlier than the time at the symbol position, the phase change amount "$\varphi_{dif}(t_1)$" of the differential detection signal >0, the phase change amount "$\varphi_{dif}(t_{g2})$" of the differential detection signal <0, and the phase change amount "$\varphi_{dif}(t_{g3})$" of the differential detection signal <0 are satisfied, and thus the value of the error function "$F_{error}$" becomes smaller than "0".

The clock error detection unit 36 or the reception clock generation unit 38 detects whether the time at the sampling position is later than the time at the symbol position (a direction of shift of the clock phase) based on the positive or negative value of the error function indicating the amount of shift of positions of the three sampling points (the clock phase shift amount) in the phase change amount of the differential detection signal. Thus, the clock error detection unit 36 can synchronize the phase of the clock used for reception with the phase of the clock used for transmission by feeding back the value of the error function to the reception clock generation unit 38.

Figure 8:
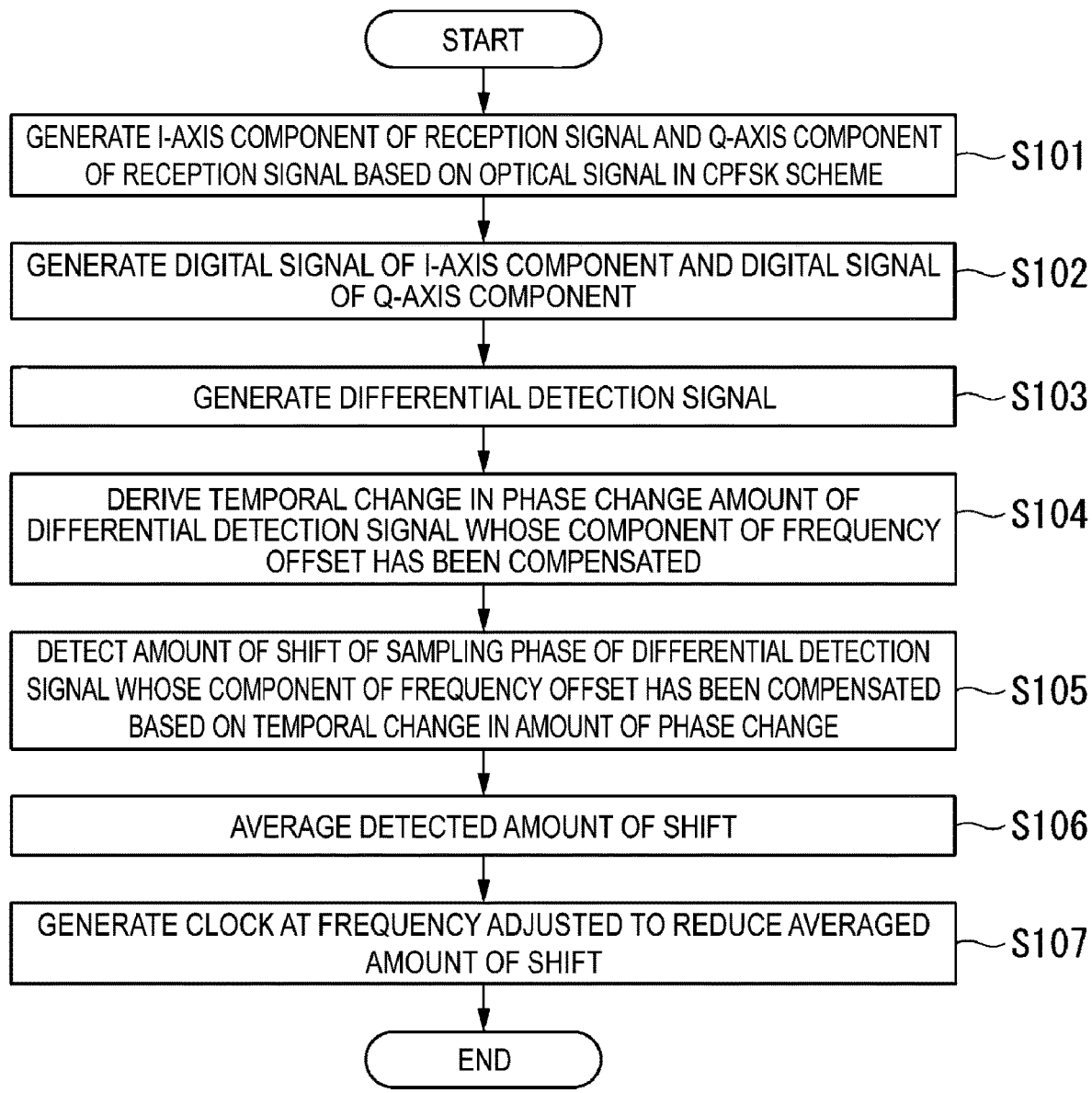
FIG. 8 is a flowchart illustrating an operation example of the optical communication system according to the first embodiment.

Next, an operation example of the optical communication system 1 will be described. FIG. 8 is a flowchart illustrating an operation example of the optical communication system 1 in the first embodiment. The optical coherent reception unit 30 generates an I-axis component of a reception signal (analog signal) and a Q-axis component of the reception signal based on a coherent optical signal (step S101). The ADC 31 generates a digital signal of the I-axis component of the reception signal and a digital signal of the Q-axis component of the reception signal (step S102).

The differential detection unit 33 generates a differential detection signal by executing differential detection on the digital signal of the I-axis component and the digital signal of the Q-axis component (step S103). The frequency offset compensation unit 35 derives a temporal change in a phase change amount of the differential detection signal whose component of a frequency offset has been compensated (step S104).

The clock error detection unit 36 detects a clock phase shift amount of the differential detection signal whose component of the frequency offset has been compensated based on the temporal change in the phase change amount of the differential detection signal (step S105). The loop filter 306 averages the clock phase shift amount (step S106). The reception clock generation unit 38 generates a clock at a frequency adjusted such that the averaged clock phase shift amount becomes small (step S107).

As described above, the optical coherent reception unit 30 receives a frequency-modulated coherent optical signal (for example, an optical signal in a CPFSK scheme) having a fixed light intensity. The optical coherent reception unit 30 generates the I-axis component of the reception signal (analog signal) and the Q-axis component of the reception signal based on the coherent optical signal by executing coherent detection for the received coherent optical signal. The ADC 31 (conversion unit) generates the digital signal of the I-axis component of the reception signal and the digital signal of the Q-axis component of the reception signal by sampling the I-axis component of the reception signal and the Q-axis component of the reception signal using the clock. The differential detection unit 33 generates the differential detection signal by executing differential detection on the digital signal of the I-axis component and the digital signal of the Q-axis component. The frequency offset compensation unit 35 derives the temporal change in the phase change amount of the differential detection signal whose component of the frequency offset has been compensated. The clock error detection unit 36 detects the clock phase shift amount of the differential detection signal whose component of the frequency offset has been compensated, based on the temporal change in the phase change amount of the differential detection signal. The reception clock generation unit 38 generates the clock at the frequency adjusted such that the clock phase shift amount becomes small.

In this manner, the clock error detection unit 36 detects the clock phase shift amount of the differential detection signal whose component of the frequency offset has been compensated based on the temporal change in the phase change amount of the differential detection signal. The reception clock generation unit 38 generates the clock at the frequency adjusted such that the clock phase shift amount becomes small. This makes it possible to synchronize the phase of the clock used for transmission of the frequency-modulated optical signal having a fixed light intensity with the phase of the clock used for reception. That is, it is possible to synchronize communication between the optical transmission apparatus and the optical reception apparatus.

Second Embodiment

In the first embodiment, processing of compensating for the frequency offset is executed for the differential detection signal expressed by Equation (9).

[Math. 9]

$$E_r(t_1) \cdot E_r(t_2)^* = A^2 e^{j(\omega_{dif} + \omega_{CFO}\Delta t)} \quad (9)$$

In the first embodiment, the Gardner method is applied to the temporal change in the phase change amount "(past" of the differential detection signal whose frequency offset has been compensated. The differential detection signal whose frequency offset has been compensated is expressed by Equation (10).

[Math. 10]

$$E_r(t_1) \cdot E_r(t_2)^* \cdot e^{j\omega_{CFO}\Delta t^*} = A^2 e^{j\varphi_{dif}} \quad (10)$$

The second embodiment differs from the first embodiment in that the Gardner method is applied to the temporal change in the Q-axis component of the differential detection signal whose frequency offset has been compensated. In the second embodiment, differences from the first embodiment will be mainly described.

In the second embodiment, clock recovery is executed based on a Q-axis component of a right-hand side "$A^2 e^{j\varphi_{dif}}$" of Equation (10).

Figure 9:
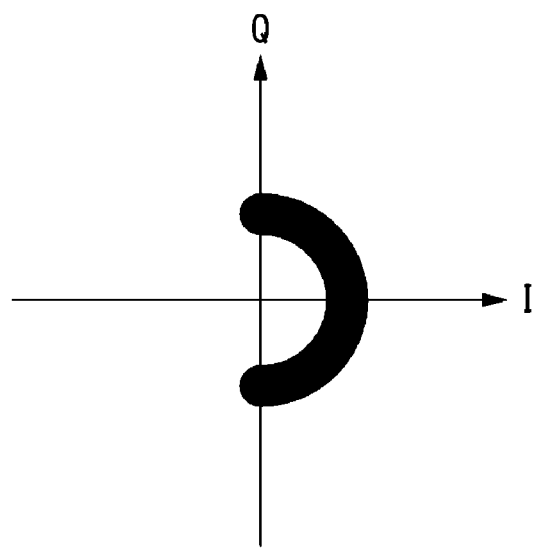
FIG. 9 is a diagram illustrating an example of a trajectory of a constellation according to a temporal change in a differential detection signal whose frequency offset has been compensated in a second embodiment.

FIG. 9 is a diagram illustrating an example of a trajectory of a constellation according to the temporal change in the differential detection signal "$A^2 e^{j\varphi_{dif}}$" whose frequency offset has been compensated in the second embodiment. When the number of phase values is 2, the constellation moves from an angle of shift "$-\pi/2$" to an angle of shift "0" over time. Further, the constellation moves from the angle of shift "0" to the angle of shift "$+\pi/2$" over time.

Figure 10:
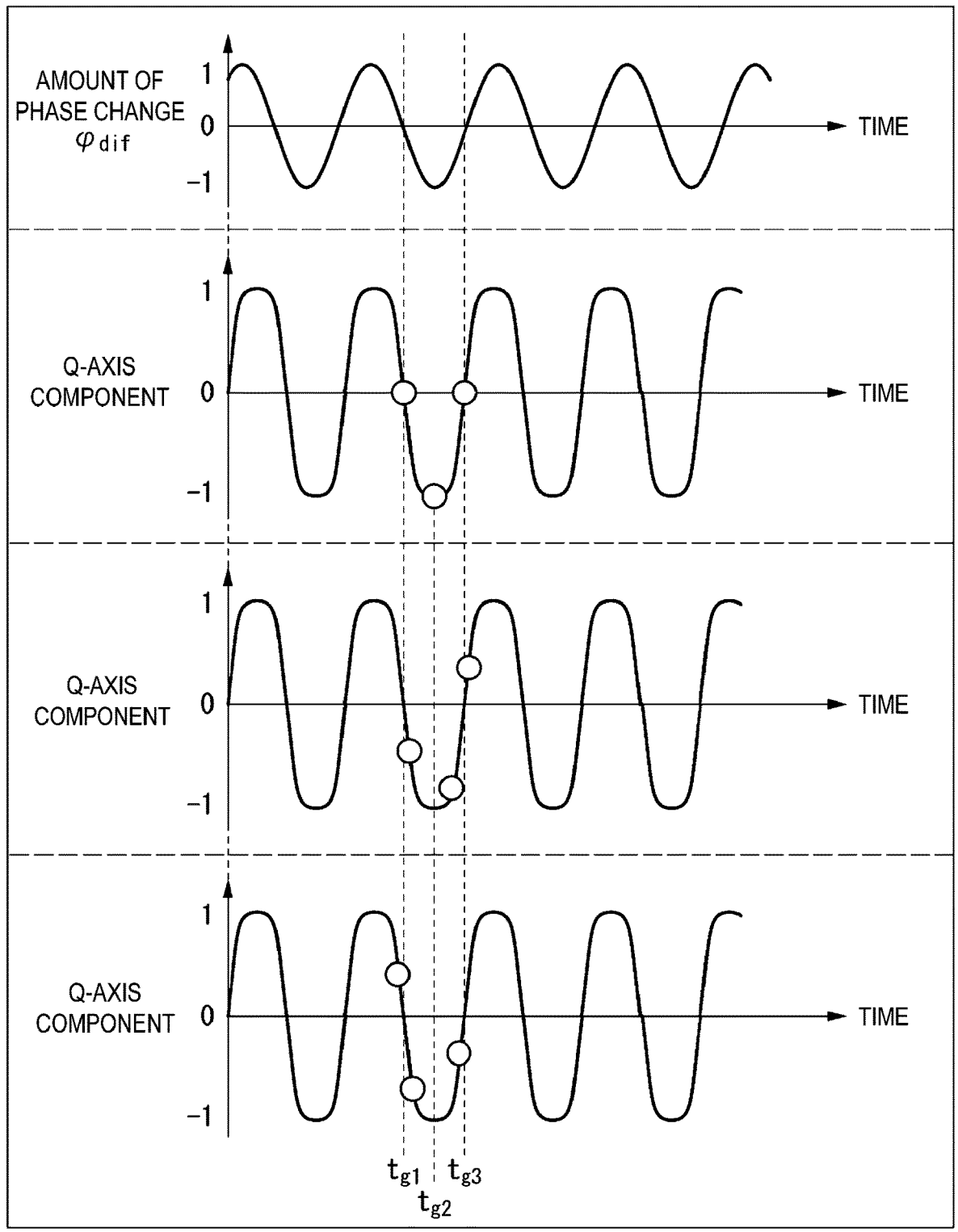
FIG. 10 is a diagram illustrating an example of a phase change amount and a Q-axis component of a differential detection signal in the second embodiment.

FIG. 10 is a diagram illustrating an example of the phase change amount and the Q-axis component of the differential detection signal in the second embodiment. In an upper section of FIG. 10, a phase change amount "$\varphi_{dif}$" of the differential detection signal whose frequency offset has been compensated is illustrated. In the upper section of FIG. 10, for simplicity of description, a phase change amount "0" and a phase change amount "1 or −1" are alternately arranged.

The Q-axis component of the differential detection signal whose frequency offset has been compensated is illustrated in each of the second to fourth sections from the top of FIG. 10. In each of the second to fourth sections from the top of FIG. 10, the Q-axis component "0" and the Q-axis component "1 or -1" are alternately arranged for simplicity of description.

The Q-axis component is expressed as "$\sin(\varphi_{dif})$" using a sine function. The Q-axis component is close to the non return to zero signal passing through an origin of the IQ plane. Thus, the clock error detection unit 36 can detect a clock shift by applying the algorithm of the Gardner method described in the first embodiment to the Q-axis component.

As illustrated in the second section from the top of FIG. 10, when the time "$t_{g2}$" is a time at the symbol position on the IQ plane, a value of the Q-axis component of the differential detection signal at the time "$t_{g1}$" and a value of the Q-axis component of the differential detection signal at the time "$t_3$" are "0", and thus, the value of the error function "$F_{error}$" becomes "0".

As illustrated in a third section from the top of FIG. 10, when the time at the sampling position (the position of the sampling point) is later than the time at the symbol position, the value of the Q-axis component of the differential detection signal at the time "$t_{g1}$"<0, the value of the Q-axis component of the differential detection signal at the time "$t_{g2}$"<0, and the value of the Q-axis component of the differential detection signal at time "$t_{g3}$">0 are satisfied, and thus the value of the error function "$F_{error}$" becomes lager than "0".

As illustrated in a fourth section from the top of FIG. 10, when the time at the sampling position is earlier than the time at the symbol position, the value of the Q-axis component of the differential detection signal at the time "$t_{g1}$">0, the value of the Q-axis component of the differential detection signal at the time "$t_2$"<0, and the value of the Q-axis component of the differential detection signal at time "$t_{g3}$"<0 are satisfied, and thus the value of the error function "$F_{error}$" becomes smaller than "0".

The clock error detection unit 36 or the reception clock generation unit 38 detects whether the time at the sampling position is later than the time at the symbol position (a direction of shift of the clock phase) based on the positive or negative value of the error function indicating the amount of shift of positions of three sampling points (the clock phase shift amount) in the Q-axis component of the differential detection signal. Thus, the clock error detection unit 36 can synchronize the phase of the clock used for reception with the phase of the clock used for transmission by feeding back the value of the error function to the reception clock generation unit 38.

Figure 11:
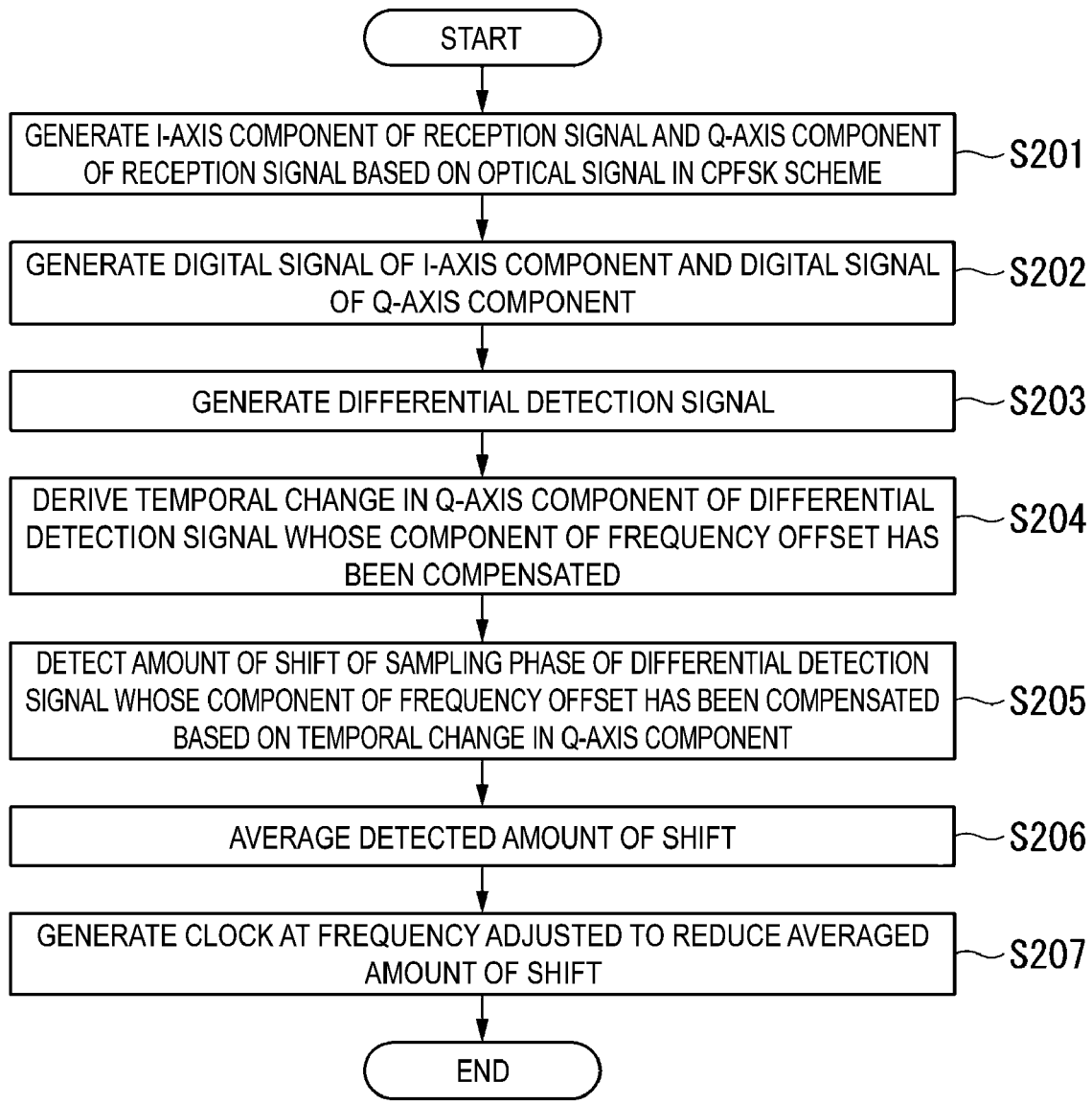
FIG. 11 is a flowchart illustrating an operation example of an optical communication system according to the second embodiment.
Figure 12:
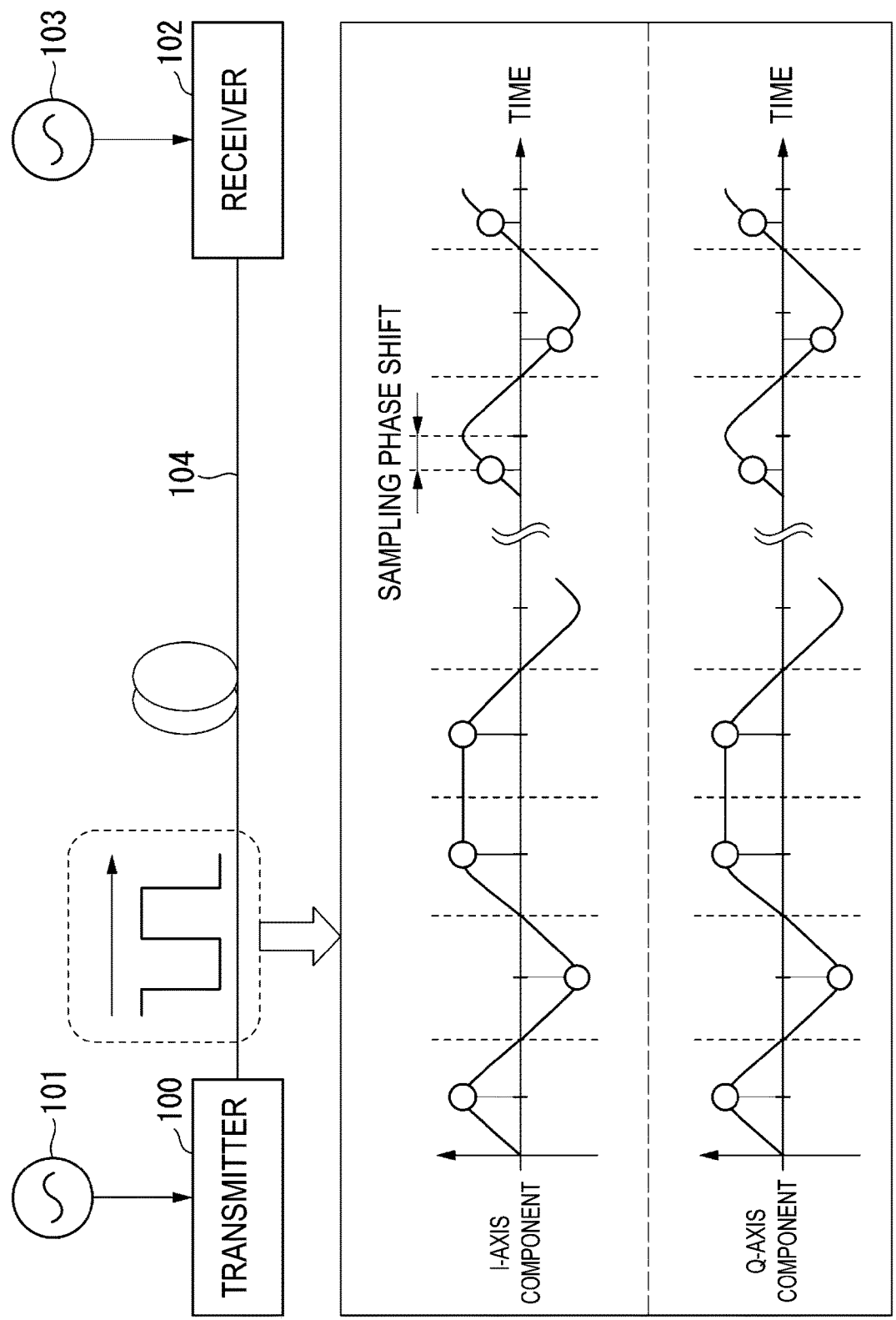
FIG. 12 is a diagram illustrating an example of an optical communication system in the related art.
Figure 13:
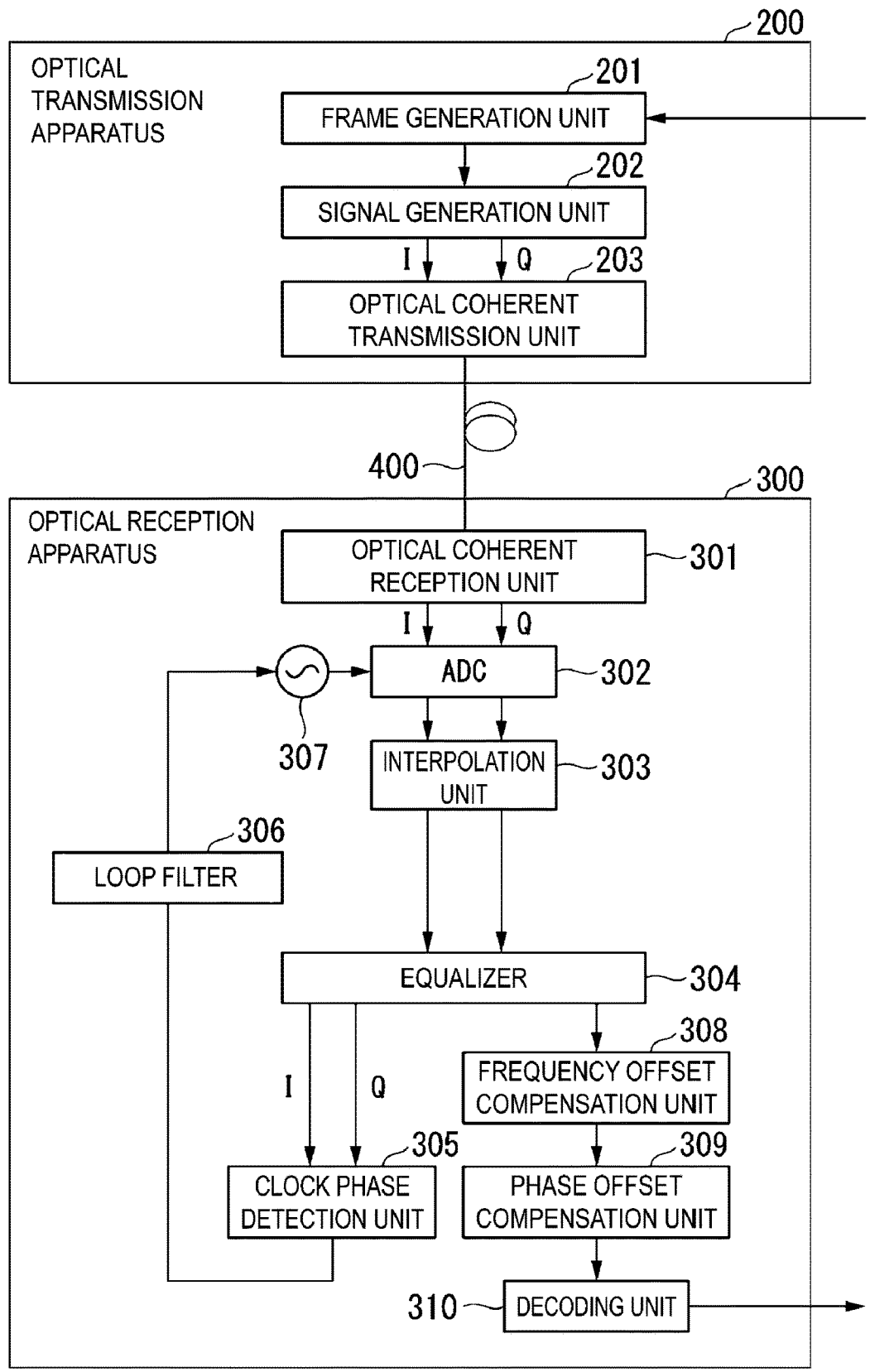
FIG. 13 is a diagram illustrating a configuration example of an optical communication system using clock recovery in a QPSK scheme or the like in the related art.
Figure 14:
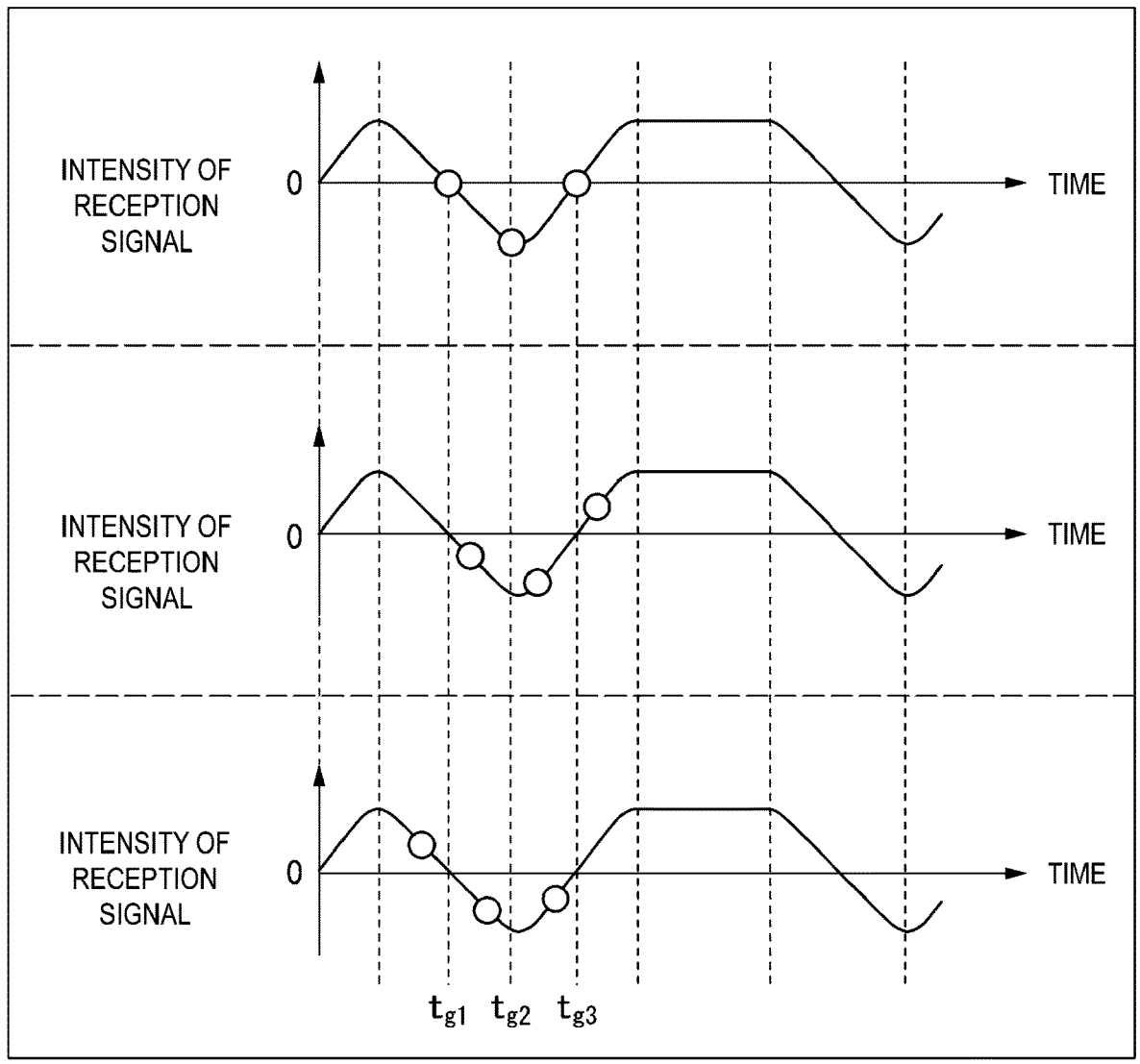
FIG. 14 is a diagram illustrating an example of clock recovery using a Gardner method in the related art.
Figure 15:
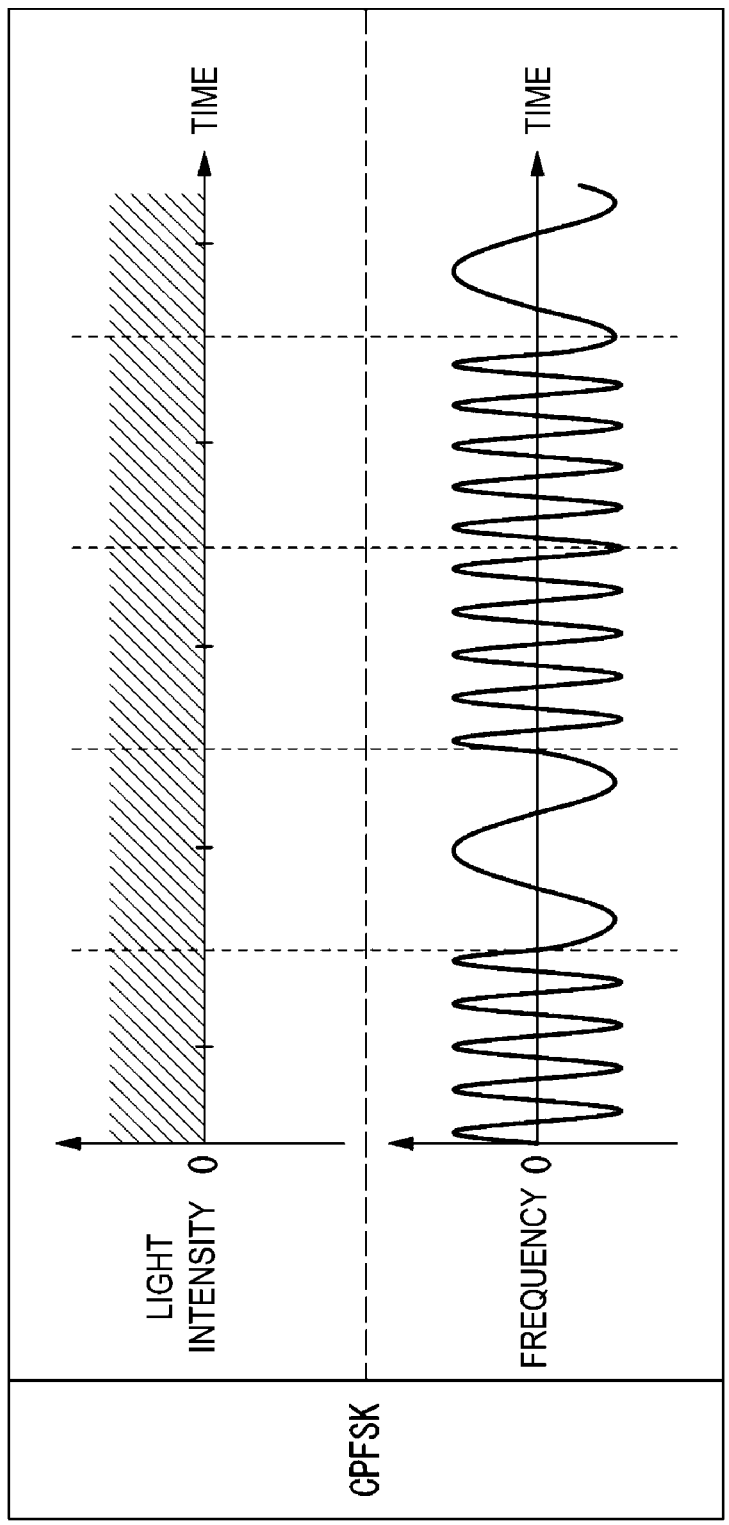
FIG. 15 is a diagram illustrating an example of frequency modulation of an optical signal in a CPFSK scheme in the related art.

FIG. 11 is a flowchart illustrating an operation example of an optical communication system according to the second embodiment. The optical coherent reception unit 30 generates an I-axis component of a reception signal (an analog signal) and a Q-axis component of the reception signal based on a coherent optical signal (step S201). The ADC 31 (conversion unit) generates a digital signal of the I-axis component of the reception signal and a digital signal of the Q-axis component of the reception signal (step S202).

The differential detection unit 33 generates a differential detection signal by executing differential detection on the digital signal of the I-axis component and the digital signal of the Q-axis component (step S203). The frequency offset compensation unit 35 derives a temporal change in the Q-axis component of the differential detection signal whose component of a frequency offset has been compensated (step S204).

The clock error detection unit 36 detects a clock phase shift amount of the differential detection signal whose component of the frequency offset has been compensated based on the temporal change in the Q-axis component of the differential detection signal (step S205). The loop filter 306 averages the clock phase shift amount (step S206). The reception clock generation unit 38 generates a clock at a frequency adjusted such that the averaged clock phase shift amount becomes small (step S207).

As described above, the optical coherent reception unit 30 receives a frequency-modulated coherent optical signal (for example, an optical signal in a CPFSK scheme) having a fixed light intensity. The optical coherent reception unit 30 generates the I-axis component of the reception signal (analog signal) and the Q-axis component of the reception signal based on the coherent optical signal by executing coherent detection for the received coherent optical signal. The ADC 31 (conversion unit) generates the digital signal of the I-axis component of the reception signal and the digital signal of the Q-axis component of the reception signal by sampling the I-axis component of the reception signal and the Q-axis component of the reception signal using the clock. The differential detection unit 33 generates the differential detection signal by executing differential detection on the digital signal of the I-axis component and the digital signal of the Q-axis component. The frequency offset compensation unit 35 derives the temporal change in the Q-axis component of the differential detection signal whose component of the frequency offset has been compensated. The clock error detection unit 36 detects the clock phase shift amount of the differential detection signal whose component of the frequency offset has been compensated based on the temporal change in the Q-axis component of the differential detection signal. The reception clock generation unit 38 generates the clock at the frequency adjusted such that the clock phase shift amount becomes small.

In this manner, the clock error detection unit 36 detects the clock phase shift amount of the differential detection signal whose component of the frequency offset has been compensated based on the temporal change in the Q-axis component of the differential detection signal. The reception clock generation unit 38 generates a clock at a frequency adjusted such that the clock phase shift amount becomes small. This makes it possible to synchronize the phase of the clock used for transmission of the frequency-modulated optical signal having a fixed light intensity with the phase of the clock used for reception. Further, it is possible to synchronize the communication between the optical transmission apparatus and the optical reception apparatus.

Some or all of functional units of the optical communication system 1 are implemented as software by a processor such as a central processing unit (CPU) executing a program stored in a storage unit having a nonvolatile recording medium (non-transitory recording medium). The program may be recorded in a computer-readable recording medium. The computer-readable recording medium is, for example, a portable medium such as a flexible disk, a magneto-optical disk, a read only memory (ROM), or a compact disc read only memory (CD-ROM), or a non-transitory recording medium such as a storage device such as a hard disk drive built into a computer system.

Some or all of functional units of the optical communication system 1 may be implemented, for example, by using hardware including an electronic circuit (or circuitry) using a large scale integration circuit (LSI), an application specific integrated circuit (ASIC), a programmable logic device (PLD), a field programmable gate array (FPGA), or the like.

Although the embodiments of the present disclosure have been described above in detail with reference to the drawings, a specific configuration is not limited to the embodiments, and includes designs and the like in a range not departing from the gist of the present disclosure.

INDUSTRIAL APPLICABILITY

The present disclosure is applicable to optical communication systems.

REFERENCE SIGNS LIST

1: Optical communication system
2: Optical transmission apparatus
3: Optical reception apparatus
4: Transmission line
20: Frame generation unit (Frame generator)
21: Signal generation unit (Signal generator)
22: Optical coherent transmission unit (Optical coherent transmitter)
30: Optical coherent reception unit (Optical coherent receiver)
31: ADC (Converter)
32: Interpolation unit (Interpolator)
33: Differential detection unit (Differential detector)
34: Equalizer
35: Frequency offset compensation unit (Frequency offset compensator)
36: Clock error detection unit (Clock error detector)
37: Loop filter
38: Reception clock generation unit (Reception clock generator)
39: Decoding unit (Decoder)
100: Transmitter
101: Transmission clock generation unit (Transmission clock generator)
102: Receiver
103: Reception clock generation unit (Reception clock generator)
104: Transmission line
200: Optical transmission apparatus
201: Frame generation unit (Frame generator)
202: Signal generation unit (Signal generator)
203: Optical coherent transmission unit (Optical coherent transmitter)
300: Optical reception apparatus
301: Optical coherent reception unit (Optical coherent receiver)
302: ADC
303: Interpolation unit (Interpolator)
304: Equalizer
305: Clock phase detection unit (Clock phase detector)
306: Loop filter
307: Reception clock generation unit (Reception clock generator)
308: Frequency offset compensation unit (Frequency offset compensator)
309: Phase offset compensation unit (Phase offset compensator)
310: Decoding unit (Decoder)
400: Transmission line

The invention claimed is:

1. An optical receiving device comprising:
    an optical coherent receiver configured to receive a frequency-modulated optical signal having a fixed light intensity and execute coherent detection for the received optical signal, thereby generating an I-axis component of a reception signal and a Q-axis component of the reception signal based on the optical signal;
    a converter configured to sample the I-axis component of the reception signal and the Q-axis component of the reception signal using a clock, thereby generating a digital signal of the I-axis component of the reception signal and a digital signal of the Q-axis component of the reception signal;
    a differential detector configured to execute differential detection for the digital signal of the I-axis component and the digital signal of the Q-axis component, thereby generating a differential detection signal;
    a frequency offset compensator configured to derive a phase change amount or a temporal change in the Q-axis component of the differential detection signal whose component of a frequency offset has been compensated;
    a clock error detector configured to detect an amount of shift of a sampling phase of the differential detection signal whose component of the frequency offset has been compensated, based on the phase change amount or the temporal change in the Q-axis component of the differential detection signal; and
    a reception clock generator configured to generate the clock at a frequency adjusted such that the amount of shift becomes small.

2. The optical receiving device according to claim 1, wherein
    the clock error detector detects the amount of shift of the sampling phase based on a predetermined algorithm for clock recovery.

3. The optical receiving device according to claim 2, wherein
    the clock error detector detects the amount of shift of the sampling phase based on the phase change amount of the differential detection signal or a value of an error function according to positions of three sampling points in the Q-axis component of the differential detection signal.

4. The optical receiving device according to claim 1, further comprising:
    a loop filter configured to average the detected amount of shift, wherein the reception clock generator generates a clock at a frequency adjusted such that the averaged amount of shift is reduced.

5. The optical receiving device according to claim 1, wherein
    the frequency modulation is continuous phase frequency shift keying.

6. A clock synchronization method executed by an optical reception apparatus, the clock synchronization method comprising:
    receiving a frequency-modulated optical signal having a fixed light intensity and executing coherent detection for the received optical signal, thereby generating an I-axis component of a reception signal and a Q-axis component of the reception signal based on the optical signal;
    sampling the I-axis component of the reception signal and the Q-axis component of the reception signal using a clock, thereby generating a digital signal of the I-axis component of the reception signal and a digital signal of the Q-axis component of the reception signal;
    executing differential detection for the digital signal of the I-axis component and the digital signal of the Q-axis component, thereby generating a differential detection signal;
    deriving a phase change amount or a temporal change in the Q-axis component of the differential detection signal whose component of a frequency offset has been compensated;
    detecting an amount of shift of a sampling phase of the differential detection signal whose component of the frequency offset has been compensated, based on the phase change amount or the temporal change in the Q-axis component of the differential detection signal; and
    generating the clock at a frequency adjusted such that the amount of shift becomes small.

\* \* \* \* \*